US012597682B2

(12) United States Patent
Chen et al.

(10) Patent No.: US 12,597,682 B2
(45) Date of Patent: Apr. 7, 2026

(54) BATTERY CELL, BATTERY, AND ELECTRIC APPARATUS

(71) Applicant: CONTEMPORARY AMPEREX TECHNOLOGY (HONG KONG) LIMITED, Hong Kong (CN)

(72) Inventors: Shengwang Chen, Ningde (CN); Zhijun Guo, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 452 days.

(21) Appl. No.: 18/360,780

(22) Filed: Jul. 27, 2023

(65) Prior Publication Data

US 2023/0369734 A1     Nov. 16, 2023

Related U.S. Application Data

(63) Continuation of application No. PCT/CN2022/114036, filed on Aug. 22, 2022.

(51) Int. Cl.
H01M 10/04 (2006.01)
H01M 50/107 (2021.01)
(Continued)

(52) U.S. Cl.
CPC ..... H01M 50/559 (2021.01); H01M 10/0431 (2013.01); H01M 50/107 (2021.01);
(Continued)

(58) Field of Classification Search
CPC ..... H01M 50/107; H01M 50/147–148; H01M 50/152; H01M 50/154; H01M 50/169;
(Continued)

(56) References Cited

U.S. PATENT DOCUMENTS

| | | |
|---|---|---|
| 5,677,078 A | 10/1997 | Juergens et al. |
| 2002/0110729 A1 | 8/2002 | Hozumi et al. |

(Continued)

FOREIGN PATENT DOCUMENTS

| | | |
|---|---|---|
| CN | 1283879 A | 2/2001 |
| CN | 101083339 A | 12/2007 |

(Continued)

OTHER PUBLICATIONS

Machine translation of Peng, CN 111613739. Originally available Sep. 1, 2020. (Year: 2020).*

(Continued)

*Primary Examiner* — Nicole M. Buie-Hatcher
*Assistant Examiner* — Jacob Buchanan
(74) *Attorney, Agent, or Firm* — ANOVA LAW GROUP, PLLC

(57) ABSTRACT

A battery cell includes an electrode assembly, a housing, and an electrode terminal. The electrode assembly includes a tab. The housing is configured to accommodate the electrode assembly. The electrode terminal is disposed in the housing and electrically connected to the tab. The electrode terminal is provided with a through hole, where the through hole is configured for injecting an electrolyte into an inner space of the housing.

20 Claims, 11 Drawing Sheets

(51) Int. Cl.

| | |
|---|---|
| *H01M 50/152* | (2021.01) |
| *H01M 50/169* | (2021.01) |
| *H01M 50/179* | (2021.01) |
| *H01M 50/186* | (2021.01) |
| *H01M 50/213* | (2021.01) |
| *H01M 50/507* | (2021.01) |
| *H01M 50/533* | (2021.01) |
| *H01M 50/536* | (2021.01) |
| *H01M 50/559* | (2021.01) |
| *H01M 50/56* | (2021.01) |
| *H01M 50/566* | (2021.01) |
| *H01M 50/636* | (2021.01) |

(52) U.S. Cl.

CPC ....... *H01M 50/152* (2021.01); *H01M 50/169* (2021.01); *H01M 50/179* (2021.01); *H01M 50/186* (2021.01); *H01M 50/213* (2021.01); *H01M 50/507* (2021.01); *H01M 50/533* (2021.01); *H01M 50/536* (2021.01); *H01M 50/56* (2021.01); *H01M 50/566* (2021.01); *H01M 50/636* (2021.01); *H01M 2220/20* (2013.01)

(58) Field of Classification Search

CPC ..... H01M 50/179; H01M 50/183–186; H01M 50/213; H01M 50/247–249; H01M 50/50–507; H01M 50/514–516; H01M 50/528; H01M 50/531–533; H01M 50/536; H01M 50/543–545; H01M 50/559–56; H01M 50/564–566; H01M 50/60–609; H01M 50/627–645; H01M 50/691

See application file for complete search history.

(56) References Cited

U.S. PATENT DOCUMENTS

| | | | |
|---|---|---|---|
| 2003/0211388 A1* | 11/2003 | Ruth ................ H01M 10/0431 429/176 |
| 2004/0128826 A1 | 7/2004 | Nakanishi et al. |
| 2007/0117011 A1* | 5/2007 | Myerberg ............ B32B 15/017 428/615 |
| 2008/0057394 A1 | 3/2008 | Rigobert et al. |
| 2009/0087733 A1 | 4/2009 | Yoon et al. |
| 2010/0310925 A1 | 12/2010 | Lee |
| 2011/0244316 A1 | 10/2011 | Rigobert et al. |
| 2012/0258355 A1 | 10/2012 | Guen |
| 2014/0087226 A1 | 3/2014 | Mishiro et al. |
| 2016/0104914 A1 | 4/2016 | Lee et al. |
| 2018/0108899 A1 | 4/2018 | Fees et al. |
| 2019/0273266 A1 | 9/2019 | Mark |
| 2020/0035959 A1 | 1/2020 | Yang et al. |
| 2020/0144584 A1 | 5/2020 | Zeng et al. |
| 2020/0176750 A1 | 6/2020 | Funami et al. |
| 2021/0013556 A1 | 1/2021 | Liu et al. |
| 2021/0257704 A1 | 8/2021 | Koichi et al. |
| 2022/0200108 A1 | 6/2022 | Kim |
| 2023/0335868 A1* | 10/2023 | Wang ................ H01M 50/184 |
| 2024/0145783 A1 | 5/2024 | Lee et al. |

FOREIGN PATENT DOCUMENTS

| | | | |
|---|---|---|---|
| CN | 101978530 A | | 2/2011 |
| CN | 202487702 U | | 10/2012 |
| CN | 102867936 A | | 1/2013 |
| CN | 101834306 B | | 4/2014 |
| CN | 204067497 U | | 12/2014 |
| CN | 104659317 A | | 5/2015 |
| CN | 105826489 A | | 8/2016 |
| CN | 206584968 U | | 10/2017 |
| CN | 206619636 U | | 11/2017 |
| CN | 207800665 U | | 8/2018 |
| CN | 207818750 U | | 9/2018 |
| CN | 208111590 U | | 11/2018 |
| CN | 208336334 U | | 1/2019 |
| CN | 208862040 U | | 5/2019 |
| CN | 109904379 A | | 6/2019 |
| CN | 209183657 U | | 7/2019 |
| CN | 209200018 U | | 8/2019 |
| CN | 209249497 U | | 8/2019 |
| CN | 209447912 U | | 9/2019 |
| CN | 209472008 U | | 10/2019 |
| CN | 110534690 A | | 12/2019 |
| CN | 209880722 U | | 12/2019 |
| CN | 210129548 U | | 3/2020 |
| CN | 111106304 A | | 5/2020 |
| CN | 111403639 A | | 7/2020 |
| CN | 111430588 A | | 7/2020 |
| CN | 111613739 A | * | 9/2020 |
| CN | 112072058 A | | 12/2020 |
| CN | 112151732 A | | 12/2020 |
| CN | 112271412 A | | 1/2021 |
| CN | 112310574 A | | 2/2021 |
| CN | 112335117 A | | 2/2021 |
| CN | 112510326 A | | 3/2021 |
| CN | 212783705 U | | 3/2021 |
| CN | 112751020 A | | 5/2021 |
| CN | 112821015 A | | 5/2021 |
| CN | 112909445 A | | 6/2021 |
| CN | 213401445 U | | 6/2021 |
| CN | 113258124 A | | 8/2021 |
| CN | 213905545 U | | 8/2021 |
| CN | 113555602 A | | 10/2021 |
| CN | 215578764 U | | 1/2022 |
| CN | 215988974 U | | 3/2022 |
| CN | 215989125 U | | 3/2022 |
| CN | 218586157 U | | 3/2023 |
| CN | 218769959 U | | 3/2023 |
| EP | 4152492 A1 | | 3/2023 |
| JP | H0249064 U | | 4/1990 |
| JP | H11149915 A | | 6/1999 |
| JP | 2000200597 A | | 7/2000 |
| JP | 2000331656 A | | 11/2000 |
| JP | 2001256954 A | | 9/2001 |
| JP | 2001345084 A | | 12/2001 |
| JP | 2003187859 A | | 7/2003 |
| JP | 2003272600 A | | 9/2003 |
| JP | 2004362956 A | | 12/2004 |
| JP | 2005129488 A | | 5/2005 |
| JP | 2006004778 A | | 1/2006 |
| JP | 2006228520 A | | 8/2006 |
| JP | 2007265846 A | | 10/2007 |
| JP | 2009522714 A | | 6/2009 |
| JP | 2009289654 A | | 12/2009 |
| JP | 2010080081 A | | 4/2010 |
| JP | 2011076786 A | | 4/2011 |
| JP | 2012043714 A | | 3/2012 |
| JP | 2012124007 A | | 6/2012 |
| JP | 2013122936 A | | 6/2013 |
| JP | 2014207095 A | | 10/2014 |
| JP | 2015099681 A | | 5/2015 |
| JP | 2016225014 A | | 12/2016 |
| JP | 2017084540 A | | 5/2017 |
| JP | 2018206474 A | | 12/2018 |
| JP | 2019040678 A | | 3/2019 |
| JP | 2023529119 A | | 7/2023 |
| KR | 20060130529 A | | 12/2006 |
| KR | 20080017506 A | | 2/2008 |
| KR | 20120062254 A | | 6/2012 |
| KR | 20160008272 A | | 1/2016 |
| KR | 20160085601 A | | 7/2016 |
| KR | 20160120996 A | | 10/2016 |
| KR | 102283792 B1 | | 8/2021 |
| WO | 0124206 A1 | | 4/2001 |
| WO | 2006035597 A1 | | 4/2006 |
| WO | 2012161302 A1 | | 11/2012 |
| WO | 2017175362 A1 | | 10/2017 |
| WO | 2019148662 A1 | | 8/2019 |

(56)                References Cited

FOREIGN PATENT DOCUMENTS

| WO | 2020111275 A1 | 6/2020 |
| WO | 2022184081 A1 | 9/2022 |
| WO | 2022191683 A1 | 9/2022 |

OTHER PUBLICATIONS

The Japan Patent Office (JPO) Notice of Reasons for Refusal for Application No. 2023-530876 Dec. 18, 2024 8 Pages (including translation).

The Japan Patent Office (JPO) Notice of Reasons for Refusal for Application No. 2023-531097 Dec. 19, 2024 8 Pages (including translation).

United States Patent and Trademark Office (USPTO) Non-final Rejection for U.S. Appl. No. 17/715,076 Nov. 6, 2024 25 Pages.

United States Patent and Trademark Office (USPTO) Final Rejection for U.S. Appl. No. 18/343,767 Jan. 7, 2025 14 Pages.

The Japan Patent Office (JPO) Notification of Reasons for Refusal for Application No. 2022-567125 Dec. 12, 2023 7 Pages (including translation).

The Japan Patent Office (JPO) Notification of Reasons for Refusal for Application No. 2023-529132 Nov. 14, 2023 14 Pages (including translation).

The European Patent Office (EPO) The Extended European Search Report for Application No. 21939994.6 Aug. 8, 2023 9 Pages.

State Intellectual Property Office of China Notice of Grant of Invention Patent Right for Application No. 202180024771.2 Oct. 16, 2023 6 pages (including translation).

State Intellectual Property Office of China Notification to Grant Patent Right for Application No. 202280007871.9 Jul. 14, 2025 6 pages (including translation).

The Japan Patent Office (JPO) Notice of Reasons for Refusal for Application No. 2024-102206 May 20, 2025 4 Pages (including translation).

The Korean Intellectual Property Office Request for the Submission of an Opinion for Application No. 10-2023-7017414 Jun. 26, 2025 15 Pages (including translation).

The Korean Intellectual Property Office Request for the Submission of an Opinion for Application No. 10-2023-7017462 Jul. 4, 2025 18 Pages (including translation).

The European Patent Office (EPO) The Extended European Search Report for Application No. 22860450.0 Mar. 27, 2025 11 Pages.

The Korean Intellectual Property Office Request for the Submission of an Opinion for Application No. 10-2022-7038353 Apr. 7, 2025 50 Pages (including translation).

The Japan Patent Office (JPO) Notice of Reasons for Refusal for Application No. 2023-530876 Jul. 1, 2024 12 Pages (including translation).

United States Patent and Trademark Office (USPTO) Non-final Rejection for U.S. Appl. No. 18/343,767 Sep. 10, 2024 22 Pages.

The World Intellectual Property Organization (WIPO) International Search Report for PCT/CN2022/114022 Oct. 24, 2022 4 pages (including English translation).

The World Intellectual Property Organization (WIPO) International Search Report for PCT/CN2022/114036 Nov. 2, 2022 4 pages (including English translation).

The World Intellectual Property Organization (WIPO) International Search Report for PCT/CN2022/114037 Oct. 26, 2022 6 pages (including English translation).

The World Intellectual Property Organization (WIPO) International Search Report for PCT/CN2021/114155 May 17, 2022 4 pages (including English translation).

The World Intellectual Property Organization (WIPO) International Search Report for PCT/CN2021/114156 Mar. 31, 2022 4 pages (including English translation).

The European Patent Office (EPO) Extended Search Report for EP Application No. 21876743.2 Feb. 1, 2023 8 Pages.

China National Intellectual Property Administration (CNIPA) The First Office Action for Application No. 202180081084.4 Nov. 3, 2025 26 Pages (including translation).

State Intellectual Property Office of China Notice of the Granting of a Patent Right for an Invention for Application No. 202180081099.0 Jul. 25, 2025 6 pages (including translation).

State Intellectual Property Office of China Notice of the Granting of a Patent Right for an Invention for Application No. 202280007865.3 Sep. 29, 2025 7 pages (including translation).

State Intellectual Property Office of China Notice of the Granting of a Patent Right for an Invention for Application No. 202311728665.X Aug. 27, 2025 7 pages (including translation).

Korean Intellectual Property Office (KIPO) Written Decision on Registration Application No. 10-2022-7038597 Nov. 18, 2024 10 Pages (including translation).

Korean Intellectual Property Office (KIPO) Request for the Submission of an Opinion for Application No. 10-2022-7038597 Sep. 10, 2024 18 Pages (including translation).

The World Intellectual Property Organization (WIPO) International Search Report for PCT/CN2021/114154 May 27, 2022 5 Pages (including translation).

* cited by examiner

1

2

BATTERY CELL, BATTERY, AND ELECTRIC APPARATUS

CROSS-REFERENCE TO RELATED APPLICATIONS

This application is a continuation of International Application No. PCT/CN2022/114036, filed on Aug. 22, 2022, which claims priority to International Patent Application No. PCT/CN2021/114156, filed on Aug. 23, 2021 and entitled "BATTERY CELL, MANUFACTURING METHOD THEREOF, AND MANUFACTURING SYSTEM THEREOF, BATTERY, AND ELECTRIC APPARATUS", which are incorporated herein by reference in their entirety.

TECHNICAL FIELD

This application relates to the field of battery technologies, and more specifically, to a battery cell, a battery, and an electric apparatus.

BACKGROUND

Battery cells are widely used in electronic devices such as mobile phones, laptops, battery carts, electric vehicles, electric aircrafts, electric ships, electric toy cars, electric toy ships, electric toy aircrafts, and electric tools. Battery cells may include nickel-cadmium battery cells, nickel-hydrogen battery cells, lithium-ion battery cells, secondary alkaline zinc-manganese battery cells, and the like.

In the development of battery technologies, how the structure of battery cells is simplified is a research direction in battery technologies.

SUMMARY

This application provides a battery cell, a battery, and an electric apparatus to simplify the structure of battery cells.

According to a first aspect, an embodiment of this application provides a battery cell. The battery cell includes an electrode assembly, a housing, and an electrode terminal. The electrode assembly includes a first tab. The housing is configured to accommodate the electrode assembly. The electrode terminal is disposed in the housing and electrically connected to the first tab. The electrode terminal is provided with a first through hole, where the first through hole is configured for injecting an electrolyte into the inner space of the housing.

In the foregoing technical solution, opening the first through hole for injecting the electrolyte on the electrode terminal can reduce the deformation of the housing during electrolyte injection, simplify the structure of the battery cell, and reduce the influence of the first through hole on the strength of the housing.

In some embodiments, the electrode terminal is electrically connected to the first tab through at least one first welding portion.

In the foregoing technical solution, the first welding portion can reduce the resistance between the electrode terminal and the first tab, improving the current capacity.

In some embodiments, the first welding portion is provided in one, and the first welding portion extends in a circumferential direction of the first through hole and surrounds at least part of the first through hole.

In the foregoing technical solution, the first welding portion can enhance the strength of a region of the electrode terminal around the first through hole, and reduce the deformation of the electrode terminal under the shock of the electrolyte.

In some embodiments, the first welding portion surrounds only part of the first through hole in the circumferential direction of the first through hole.

In the foregoing technical solution, the periphery of the first through hole is not sealed by the first welding portion, and a gap between the electrode terminal and a member welded to the electrode terminal is not blocked by the first welding portion, so that part of the electrolyte flowing in through the first through hole can flow through the gap, thereby improving the efficiency of electrolyte injection.

In some embodiments, an angle at which the first welding portion surrounds the first through hole is $\alpha$, and $180° \leq \alpha \leq 360°$.

$\alpha$ is positively correlated with a current flow area of the first welding portion. The smaller $\alpha$ is, the smaller the current flow area of the first welding portion is, and the higher the heat generated when current flows through the first welding portion is. In the foregoing technical solution, a is defined in the range of 180° to 360°, so that the first welding portion satisfies the requirements of the battery cell for the current capacity and temperature rise control.

In some embodiments, the first welding portion is provided in plurality, and the plurality of first welding portions are disposed at intervals in a circumferential direction of the first through hole.

On the premise that the total area is constant, compared with the solution of providing one first welding portion, this solution of providing the first welding portion in plurality can reduce the power for once welding and the heat generated.

In some embodiments, a spacing angle $\beta$ between any two adjacent first welding portions in the circumferential direction of the first through hole is less than 30°.

The larger the value of the angle $\beta$ is, the more scattered the plurality of first welding portions are, and the smaller the total current flow area of the plurality of first welding portions is; and the smaller the value of the angle $\theta$ is, the more concentrated the plurality of first welding portions are, and the larger the total current flow area of the plurality of first welding portions is.

In this embodiment of this application, $\beta$ is defined to be less than 30° so as to satisfy requirements of the battery cell for current capacity and temperature rise control, and reduce the risk of tearing of the first welding portion during vibration of the battery cell.

In some embodiments, each of the first welding portions extends in a radial direction of the first through hole.

In the foregoing technical solution, the first welding portion extends in the radial direction of the first through hole, so that dimension of the first welding portion in the circumferential direction of the first through hole can be reduced, and more first welding portions can be arranged on the periphery of the first through hole for the electrode terminal, thereby improving the current capacity and reducing heat generated.

In some embodiments, depth of the first welding portion in the axial direction of the first through hole is h; and minimum distance between the first welding portion and the first through hole in the radial direction of the first through hole is d; and d and h satisfy $0.1 \leq h/d \leq 0.6$.

The larger the h is, the greater the power required for welding is, the higher the heat generated during welding is, the greater the heat stress acting on a region close to the first through hole is, and the greater the degree of deformation of the first through hole is. The smaller the d is, the more the heat conducted to a region close to the first through hole during welding is, the greater the heat stress acting on a region close to the first through hole is, and the greater the degree of deformation of the first through hole is. Under the condition that the h/d is too large, the first through hole is severely deformed, and an electrolyte injection head is difficult to fit to the first through hole, which affects the electrolyte injection efficiency. In the foregoing technical solution, the value of h/d is defined to be less than or equal to 0.6, which can reduce the larger heat stress acting on the region close to the first through hole, reduce the deformation of the first through hole, and facilitate the fitting of the electrolyte injection head and the first through hole.

The smaller the h is, the lower the current capacity and strength of the first welding portion are, and the higher the risk of tearing of the first welding portion during vibration of the battery cell is. The larger the d is, the smaller the area of a region of the electrode terminal that can be used for welding is, and the more restrained the current capacity and strength of the first welding portion is. Under the condition that h/d is too small, the current capacity and strength of the first welding portion will be insufficient. In the foregoing technical solution, the value of h/d is defined to be greater than or equal to 0.1, so as to enable the current capacity and strength of the first welding portion to satisfy the requirements.

In some embodiments, d and h satisfy $0.2 \leq h/d \leq 0.5$.

In some embodiments, $1.6 \text{ mm} \leq d \leq 5.5 \text{ mm}$.

Under the condition that d is too small, too much heat is conducted to the region close to the first through hole during welding, the heat stress acting on the region close to the first through hole is too large, the deformation of the first through hole is serious, and the electrolyte injection head is difficult to fit to the first through hole, which affects the electrolyte injection efficiency. Under the condition that d is too large, an area of the electrode terminal that can be used for welding is relatively small, and the current capacity and strength of the first welding portion are insufficient. In the foregoing technical solution, defining the value of d in the range of 1.6 mm to 5.5 mm can reduce the deformation of the first through hole, facilitate the fitting of the electrolyte injection head and the first through hole, and enable the current capacity and strength of the first welding portion to satisfy the requirements.

In some embodiments, the electrode assembly is a winding structure, and the electrode assembly has a second through hole at the winding center. The first through hole communicates with the second through hole, so that an electrolyte injected through the first through hole is capable of flowing into the second through hole.

In the foregoing technical solution, in the electrolyte injection process, the electrolyte can flow into the second through hole via the first through hole, and the electrolyte flowing into the second through hole can infiltrate the electrode assembly from the inside, thereby improving the infiltration efficiency of the electrode assembly.

In some embodiments, in the axial direction of the first through hole, a projection of the first through hole at least partially overlaps with a projection of the second through hole.

In the foregoing technical solution, the first through hole and the second through hole are opposite in the axis of the first through hole, and part of the electrolyte flowing through the first through hole can enter the second through hole without changing the flow direction, thereby improving the infiltration efficiency of the electrode assembly.

In some embodiments, in the axial direction of the first through hole, a projection of the second through hole is larger than a projection of the first through hole.

In the foregoing technical solution, the second through hole has a larger cross-sectional area than the first through hole. This allows the second through hole to contain more electrolyte, which helps to increase the efficiency of the electrolyte infiltrating the electrode assembly from the inside.

In some embodiments, in the axial direction of the first through hole, a projection of the first through hole falls within a projection of the second through hole.

In the foregoing technical solution, the solid part of the electrode assembly can avoid the first through hole, which reduces the electrolyte directly shocking on the electrode assembly, and reduces the risk of deformation of the electrode assembly.

In some embodiments, diameter of the first through hole is $D_1$, diameter of the second through hole is $D_2$, and $D_1$ and $D_2$ satisfy $65\% \leq D_1/D_2 \leq 95\%$.

The larger $D_1$ is, the higher the efficiency of the electrolyte injection is, the shorter the electrolyte injection time is, the less the volume of electrolyte that can be infiltrated in the electrode assembly during electrolyte injection is, and the less the total volume of the electrolyte injected is. The smaller $D_2$ is, the smaller the area of a hole wall of the second through hole is, and the lower the efficiency of the electrolyte infiltrating from the inside of the electrode assembly is. Under the condition that the $D_1/D_2$ is too large, a volume of the electrolyte injected is relatively small, affecting the cycle life of the battery cell. In the foregoing technical solution, the value of $D_1/D_2$ is defined to be less than or equal to 95%, so that the volume of the electrolyte injected satisfies the requirement.

The smaller $D_1$ is, the lower the efficiency of electrolyte injection and the longer the electrolyte injection time are; and the larger $D_2$ is, the higher the efficiency of the electrolyte infiltrating from the inside of the electrode assembly is. Under the condition that the $D_1/D_2$ is too small, an electrolyte injection time is relatively long, leading to relatively low production efficiency. In addition, the larger $D_2$ is, the smaller the capacity of the electrode assembly is, the lower the utilization of the inner space of the battery cell is, and the lower the energy density of the battery cell is. In the foregoing technical solution, when the value of $D_1/D_2$ is defined to be greater than or equal to 65%, the electrolyte injection efficiency is raised, and the loss of the energy density of the battery cell due to the second through hole is reduced.

In some embodiments, $D_2 \geq D_1 + 0.2 \text{ mm}$.

During assembly of the battery cell, the electrode assembly may be shifted due to assembly errors, causing the first through hole to be opposite the solid part of the electrode assembly. As a result, the electrode assembly is caused to be shocked by the electrolyte. In the foregoing technical solution, $D_2 \geq D_1 + 0.2 \text{ mm}$ being controlled can provide a deviation margin for the electrode assembly, reduce the risk that the solid part of the electrode assembly is opposite the first through hole, reduce the risk of the electrolyte directly shocking the electrode assembly, and reduce the risk of deformation of the electrode assembly.

In some embodiments, the battery cell further includes a current collecting member for electrically connecting the electrode terminal and the first tab. The current collecting member includes a third through hole, where the third through hole is at least partially disposed between the first through hole and the second through hole.

In the foregoing technical solution, the third through hole is provided so that the current collecting member can avoid the electrolyte flowing through the first through hole, reducing the blocking of the current collecting member to the electrolyte in the electrolyte injection process. In this way, the electrolyte can smoothly flow through the third through hole and flow into the second through hole, thereby improving the infiltration efficiency of the electrode assembly.

In some embodiments, in the axial direction of the first through hole, a projection of the third through hole is smaller than a projection of the second through hole.

In the foregoing technical solution, the second through hole has a larger cross-sectional area than the third through hole. In this way, the electrolyte flowing through the third through hole can quickly flow into the second through hole, helping improve the efficiency of the electrolyte infiltrating the electrode assembly from the inside.

In some embodiments, in the axial direction of the first through hole, a projection of the third through hole is larger than a projection of the first through hole.

In the foregoing technical solution, the third through hole has a larger cross-sectional area than the first through hole. In this way, the risk of the current collecting member blocking the first through hole can be reduced, the electrolyte can smoothly flow through the third through hole and enter the second through hole, and the efficiency of the electrolyte infiltrating the electrode assembly from the inside can be improved.

In some embodiments, in the axial direction of the first through hole, a projection of the first through hole falls within a projection of the third through hole.

In the foregoing technical solution, not only the risk of the current collecting member blocking the first through hole can be reduced so that the electrolyte can smoothly flow into the housing, but also shocking on the current collecting member can be reduced so that the risk of cracking at the joint between the current collecting member and the electrode terminal can be reduced.

In some embodiments, in the axial direction of the first through hole, a projection of the third through hole falls within a projection of the second through hole.

In the foregoing technical solution, the blocking of the solid part of the electrode assembly to the third through hole can be reduced, so that the electrolyte can flow into the second through hole smoothly.

In some embodiments, the first through hole, the second through hole, and the third through hole are arranged coaxially.

In the foregoing technical solution, with the three through holes arranged coaxially, the inflow of the electrolyte can be made smoother, and the shocking from the electrolyte to the current collecting member and the electrode assembly can be reduced.

In some embodiments, the electrode terminal includes a sealing plate and a terminal body, where the terminal body is provided with the first through hole, and the sealing plate is connected to the terminal body and configured to seal the first through hole.

In the foregoing technical solution, after the processes related to the first through hole are completed, the sealing plate is connected to the terminal body so as to reduce the risk of leakage of the electrolyte via the first through hole and improve the sealing performance.

In some embodiments, the terminal body includes a concave portion and a connecting portion located on a side of the concave portion facing the electrode assembly, the first through hole runs through the connecting portion, and the connecting portion is electrically connected to the first tab through at least one of the first welding portions. At least part of the sealing member is accommodated in the concave portion.

In the foregoing technical solution, opening the concave portion on the terminal body can reduce thickness of the connecting portion, thereby reducing welding power required for welding, reducing the risk of other components being burned, and enhancing safety. The concave portion can also provide an accommodating space for the sealing plate, thereby reducing dimension of the sealing plate protruding from the terminal body, reducing the space occupied by the electrode terminal, and increasing the energy density of the battery cell.

In some embodiments, the housing includes a cylinder and a cover connected to the cylinder. The cylinder is disposed around the periphery of the electrode assembly. The cover is provided with an electrode lead-out hole. The electrode terminal is disposed in the electrode lead-out hole.

In some embodiments, the cover and the cylinder are integrally formed, so that the connecting process of the cover and the cylinder is left out. When the cover and the cylinder are electrically connected to a positive electrode or a negative electrode of the electrode assembly, it is precisely because of the joint between the cover and the cylinder being an integrated structure, resistance at the joint between cover and the cylinder is small, thereby improving the current capacity. The cover may be configured to be connected to an external component (for example, the busbar). When the battery cell is subjected to external impact, the external component may pull the cover, so that the joint between the cover and the cylinder is subjected to the action of force. In the foregoing technical solution, the cover and the cylinder are integrated so as to enhance strength of the joint between the cover and the cylinder and reduce the risk of failure in the joint between the cover and the cylinder.

In some embodiments, the electrode assembly further includes a second tab, where the second tab is opposite in polarity to the first tab, and the second tab is electrically connected to the cover.

In the foregoing technical solution, one of the cover and the electrode terminal may be used as a positive output electrode of the battery cell, and the other may be used as a negative output electrode of the battery cell. In the foregoing technical solution, the positive output electrode and the negative output electrode are disposed on the same side of the battery cell, which can simplify the connection process between a plurality of battery cells.

In some embodiments, the first tab is disposed at an end of the electrode assembly facing the electrode terminal, and the second tab is disposed at an end of the electrode assembly facing away from the electrode terminal.

In the foregoing technical solution, the first tab and the second tab are respectively disposed at two opposite ends of the electrode assembly, so that the distance between the first tab and the second tab can be increased so as to reduce the risk of conduction between the first tab and the second tab and enhance the safety.

In some embodiments, the second tab is a negative electrode tab, and a substrate material of the housing is steel.

In the foregoing technical solution, the housing is electrically connected to the negative electrode tab, meaning that the housing is in a low potential state. The steel housing is not easily corroded by the electrolyte in a low potential state.

In some embodiments, the cylinder has an opening at an end facing away from the cover, and the battery cell further includes a cover plate for sealing the opening.

According to a second aspect, an embodiment of this application provides a battery, including the battery cell according to any one of the embodiments of the first aspect.

According to a third aspect, an embodiment of this application provides an electric apparatus, including the battery according to the second aspect, where the battery is configured to supply electrical energy.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and a person of ordinary skill in the art may still derive other drawings from the accompanying drawings without creative efforts.

Figure 1:
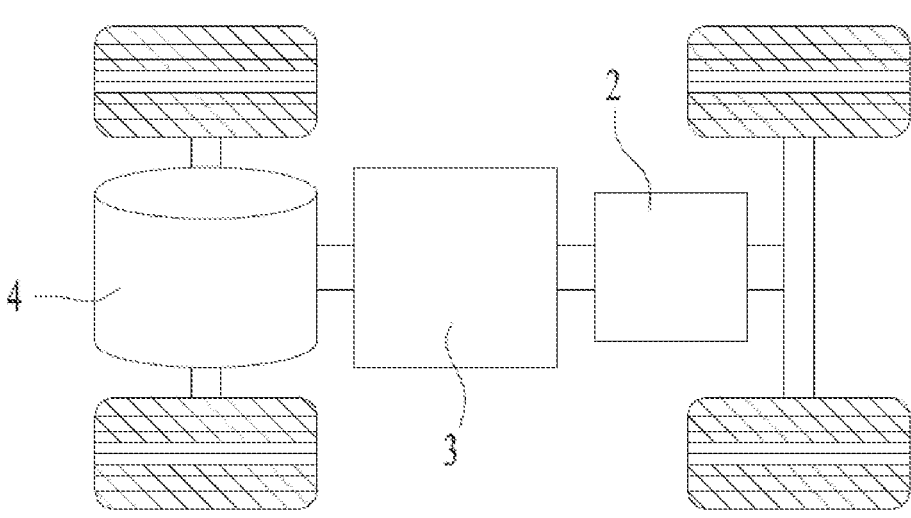
FIG. 1 is a schematic structural diagram of a vehicle according to some embodiments of this application.

In the accompanying drawings, the figures are not drawn to scale.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. A person of ordinary skills in the art can understand specific meanings of these terms in this application as appropriate to specific situations.

The term "and/or" in this application is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between contextually associated objects.

In the embodiments of this application, the same reference signs denote the same members. For brevity, in different embodiments, detailed descriptions of the same members are not repeated. It should be understood that, as shown in the accompanying drawings, sizes such as thickness, length, and width of various members and sizes such as thickness, length, and width of integrated devices in the embodiments of this application are merely for illustrative purposes and should not constitute any limitations on this application.

In this application, "a plurality of" means more than two (inclusive).

The term "parallel" in this application not only includes the absolutely parallel case, but also includes the approximately parallel case in the conventional understanding of engineering; likewise, the term "perpendicular" not only includes the absolutely perpendicular case, but also includes the approximately perpendicular case in the conventional understanding of engineering.

The battery cell in the application may include a lithium-ion secondary battery cell, a lithium-ion primary battery cell, a lithium-sulfur battery cell, a sodium-lithium-ion battery cell, a sodium-ion battery cell, a magnesium-ion battery cell, or the like. This is not limited in the embodiments of this application.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active material layer. The positive electrode active material layer is applied on a surface of the positive electrode current collector. The positive electrode current collector includes a positive electrode current collecting portion and a positive electrode current tab. The positive electrode current collecting portion is coated with the positive electrode active material layer, and the positive electrode tab is coated with no positive electrode active material layer. With a lithium-ion battery as an example, its positive electrode current collector may be made of aluminum, and its positive electrode active material layer includes a positive electrode active substance which may be lithium cobaltate, lithium iron phosphate, ternary lithium, lithium manganate, or the like. The negative electrode plate includes a negative electrode current collector and a negative electrode active material layer. The negative electrode active material layer is applied on a surface of the negative electrode current collector. The negative electrode current collector includes a negative electrode current collecting portion and a negative electrode tab. The negative electrode current collecting portion is coated with the negative electrode active material layer, and the negative electrode tab is coated with no negative electrode active material layer. The negative electrode current collector may be made of copper, and the negative electrode active material layer includes a negative electrode active substance, which may be carbon, silicon, or the like. A material of the separator may be PP (polypropylene, polypropylene), PE (polyethylene, polyethylene), or the like.

The battery cell further includes a housing for accommodating the electrode assembly and an electrode terminal disposed on the housing. The electrode terminal is configured to be electrically connected to the electrode assembly, so as to realize charge and discharge of the electrode assembly.

In the production of the battery, it is necessary to inject electrolyte into the inside of the housing. In order to achieve electrolyte injection, the inventors attempted to open an electrolyte injection hole in the housing. When electrolyte injection is required, an electrolyte injection head of an electrolyte injection device presses against the housing, and then the electrolyte injection head injects electrolyte into the housing via an electrolyte injection hole.

However, the inventors found that the structure of the housing is complicated when the electrolyte injection hole is opened in the housing. The electrolyte injection hole occupies the space of the housing and affects the mounting of other members on the housing. The housing is thinner and has lower strength than the electrode terminal. During electrolyte injection, the housing may be deformed due to the extrusion of the electrolyte injection head, which leads to the risk of defects in the profile of the battery cell.

In view of this, an embodiment of this application provides a technical solution in which opening a through hole for injecting the electrolyte on the electrode terminal can reduce the deformation of the housing during electrolyte injection, simplify the structure of the battery cell, and reduce the influence of the first through hole on the strength of the housing.

The technical solution described in the embodiments of this application is applicable to batteries and electric apparatuses using a battery.

The electric apparatus may be vehicles, mobile phones, portable devices, notebook computers, ships, spacecrafts, electric toys, electric tools, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, and an electric toy airplane. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric apparatus.

For ease of description, the electric apparatus being a vehicle is used as example for description of the following embodiments.

FIG. 1 is a schematic structural diagram of a vehicle according to some embodiments of this application. As shown in FIG. 1, the vehicle 1 is provided with a battery 2 inside, and the battery 2 may be disposed at the bottom or in the front or at the rear of the vehicle 1. The battery 2 may be configured to supply power to the vehicle 1. For example, the battery 2 may be used as an operational power source for the vehicle 1.

The vehicle 1 may further include a controller 3 and a motor 4, where the controller 3 is configured to control the battery 2 to supply power to the motor 4, for example, to satisfy power needs of start, navigation, and driving of the vehicle 1.

In some embodiments of this application, the battery 2 can be used as not only the operational power source for the vehicle 1 but also a driving power source for the vehicle 1, replacing or partially replacing fossil fuel or natural gas to provide driving traction for the vehicle 1.

Figure 2:
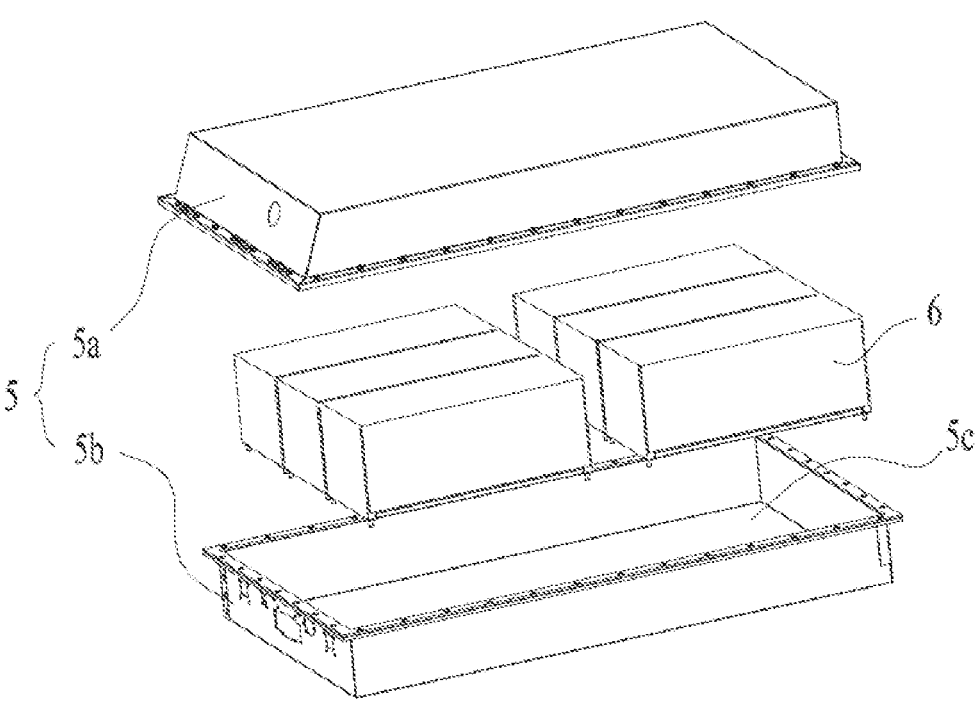
FIG. 2 is a schematic exploded view of a battery according to some embodiments of this application.

FIG. 2 is a schematic exploded view of a battery according to some embodiments of this application. As shown in FIG. 2, the battery 2 includes a box 5 and a battery cell (not shown in FIG. 2), and the battery cell is accommodated in the box 5.

The box 5 is configured to accommodate the battery cell, and the box 5 may have various structures. In some embodiments, the box 5 may include a first box portion 5a and a second box portion 5b. The first box portion 5a and the second box portion 5b fit together to jointly define an accommodating space 5c for accommodating the battery cell. The second box portion 5b may be a hollow structure with an opening formed at an end, the first box portion 5a is a plate-shaped structure, and the first box portion 5a covers the opening side of the second box portion 5*b* so as to form the box 5 having the accommodating space 5*c*; and the first box body portion 5*a* and the second box portion 5*b* may alternatively both be a hollow structure with an opening formed at an end, and the opening side of the first box portion 5*a* is engaged with the opening side of the second box portion 5*b* so as to form the box 5 having the accommodating space 5*c*. Certainly, the first box portion 5*a* and the second box portion 5*b* may be in various shapes, such as cylinder and cuboid.

In order to improve the airtightness after the connection of the first box portion 5*a* and the second box portion 5*b*, a sealing element such as sealing gum and sealing ring may also be disposed between the first box portion 5*a* and the second box portion 5*b*.

Assuming that the first box portion 5*a* fits on a top of the second box portion 5*b*, the first box portion 5*a* may also be referred to as an upper cover, and the second box portion 5*b* may also be referred to as a lower box.

There may be one or more battery cells in the battery 2. Under the condition that a plurality of battery cells are provided, the plurality of battery cells may be connected in series, parallel, or series-parallel, where being connected in series-parallel means a combination of series and parallel connections of the plurality of battery cells. The plurality of battery cells may be directly connected in series, parallel, or series-parallel, and then an entirety of the plurality of battery cells is accommodated in the box 5; or certainly, the battery may be formed by a plurality of battery cells being connected in series, parallel, or series-parallel first to form a battery module 6 and then a plurality of battery modules 6 being connected in series, parallel, or series-parallel to form an entirety which is accommodated in the box 5.

Figure 3:
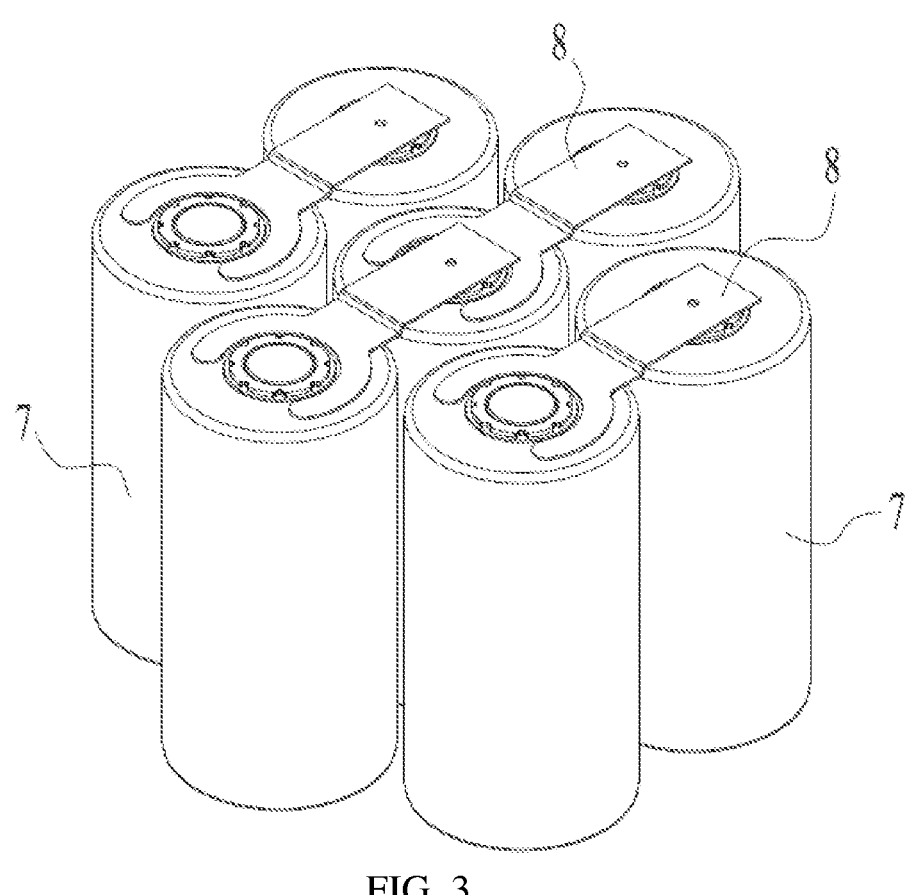
FIG. 3 is a schematic structural diagram of a battery module shown in FIG. 2.

FIG. 3 is a schematic structural diagram of a battery module shown in FIG. 2.

In some embodiments, as shown in FIG. 3, there are a plurality of battery cells 7, and the plurality of battery cells 7 are connected in series, parallel, or series-parallel to form a battery module 6. A plurality of battery modules 6 are then connected in series, parallel, or series-parallel to form an entirety, which is accommodated in the box.

The plurality of battery cells 7 in the battery module 6 may be electrically connected via a busbar 8, so that the plurality of battery cells 7 in the battery module 6 are connected in series, parallel, or series-parallel. There may be one or more busbars, and each busbar 8 is configured to electrically connect at least two battery cells.

Figure 4:
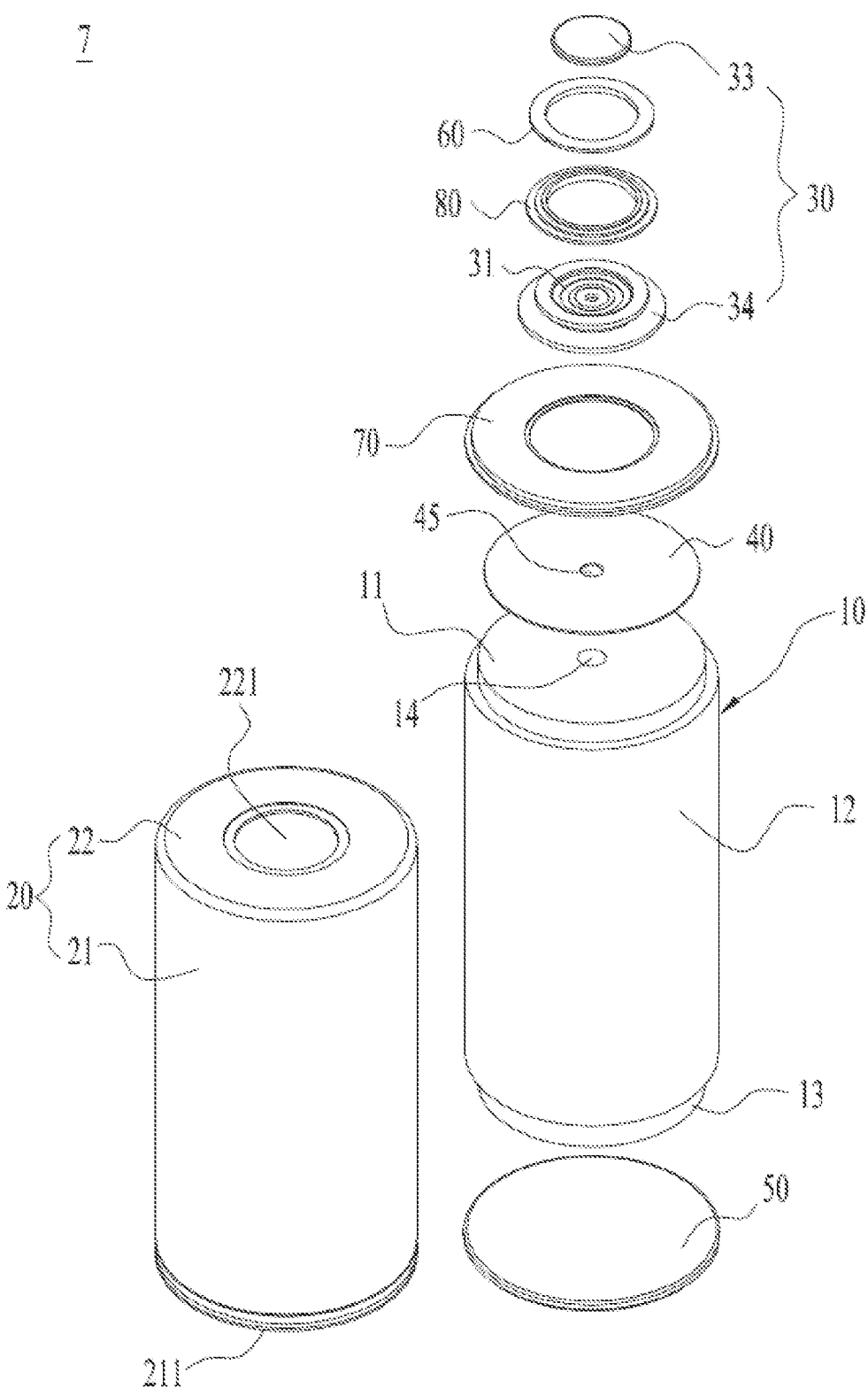
FIG. 4 is a schematic exploded view of a battery cell according to some embodiments of this application.
Figure 5:
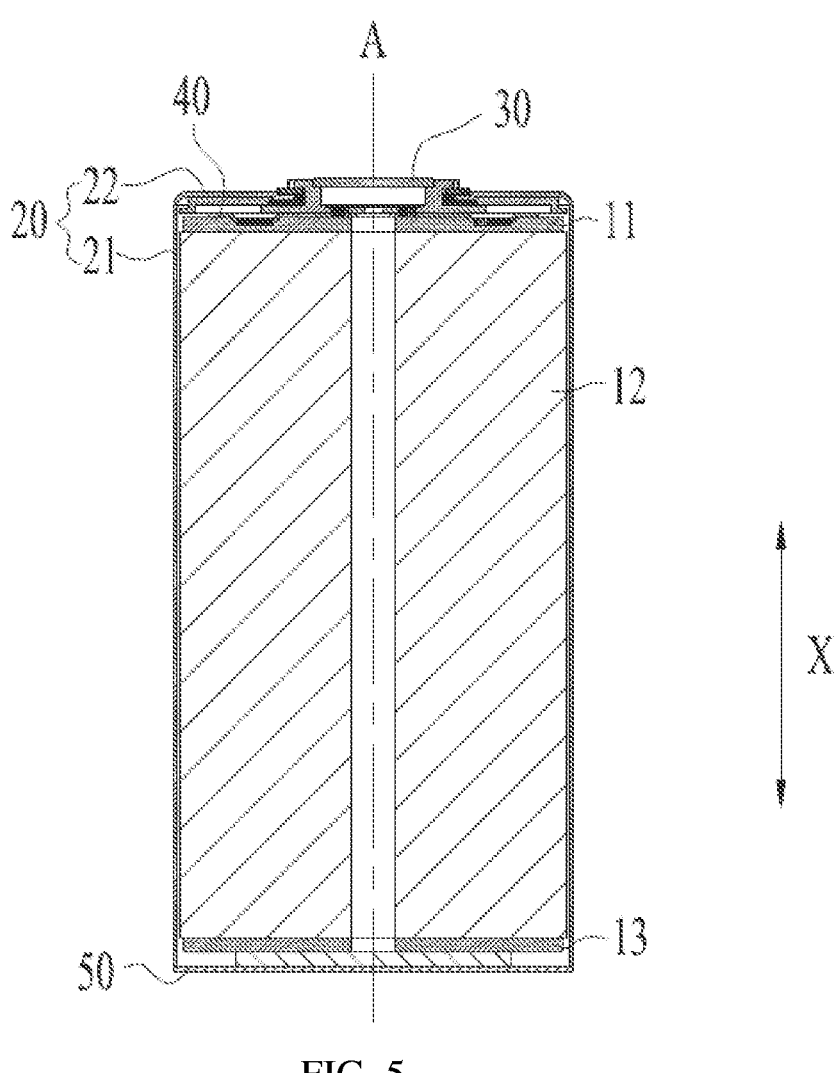
FIG. 5 is a schematic cross-sectional view of a battery cell according to some embodiments of this application.
Figures 6, 7:
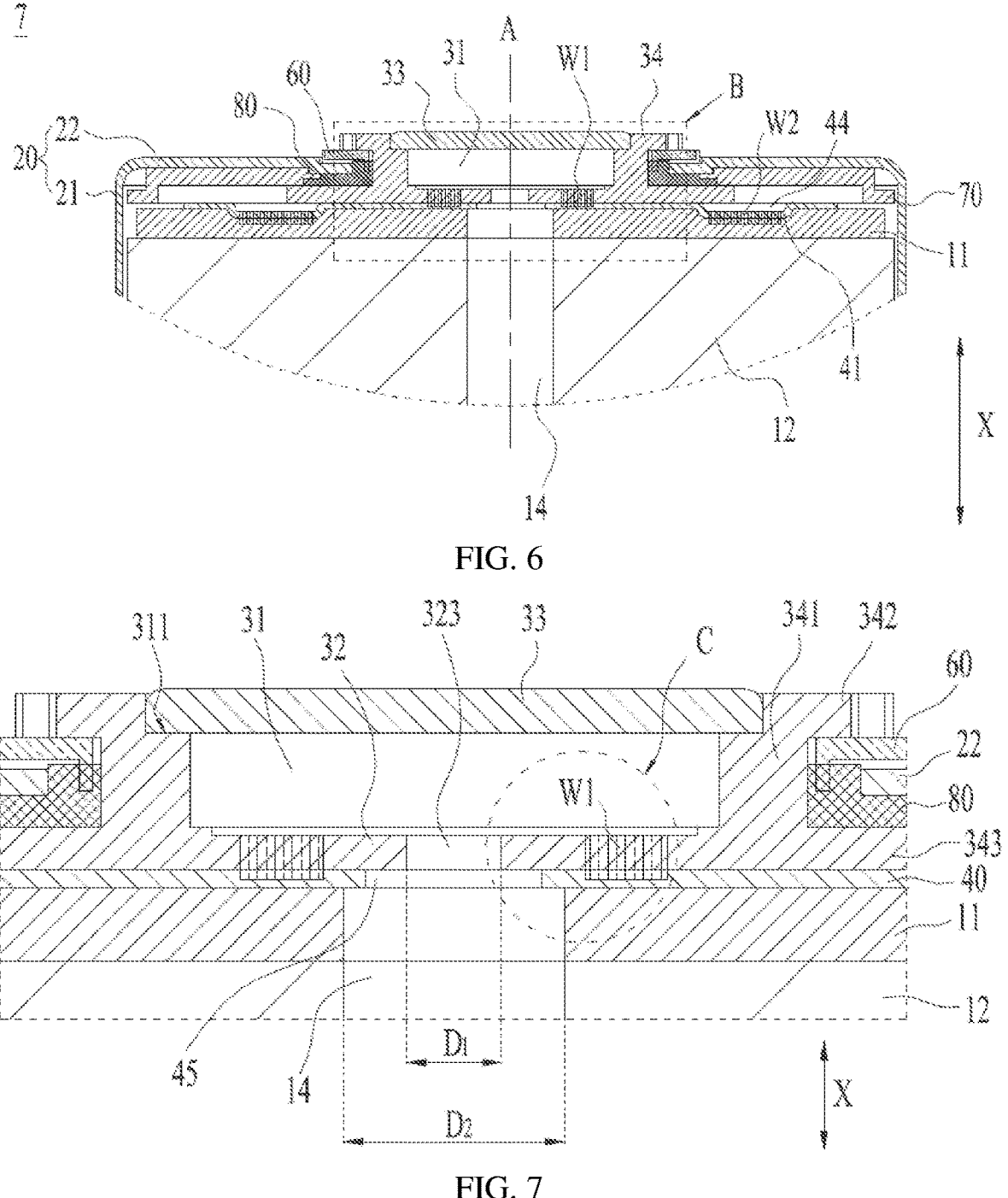
FIG. 6 is an enlarged partial schematic diagram of the battery cell shown in FIG. 5.
FIG. 7 is an enlarged schematic diagram at block B in FIG. 6.

FIG. 4 is a schematic exploded view of a battery cell according to some embodiments of this application; FIG. 5 is a schematic cross-sectional view of a battery cell according to some embodiments of this application; FIG. 6 is an enlarged partial schematic diagram of the battery cell shown in FIG. 5; and FIG. 7 is an enlarged schematic diagram of bock B in FIG. 6.

As shown in FIG. 4 to FIG. 7, the battery cell 7 in the embodiments of this application includes an electrode assembly 10, a housing 20, and an electrode terminal 30. The electrode assembly 10 includes a first tab 11. The housing 20 is configured to accommodate the electrode assembly 10. The electrode terminal 30 is disposed in the housing 20 and electrically connected to the first tab 11. The electrode terminal 30 is provided with a first through hole 323, where the first through hole 323 is configured for injecting an electrolyte into the inner space of the housing 20.

The electrode assembly 10 includes a first electrode plate and a second electrode plate that have opposite polarities. One of the first electrode plate and the second electrode plate is a positive electrode plate, and the other is a negative electrode plate. For example, the electrode assembly 10 generates electrical energy through oxidation and reduction reactions during intercalation/deintercalation of ions in the positive electrode plate and the negative electrode plate. Optionally, the electrode assembly 10 further includes a separator, where the separator is configured to insulate the first electrode plate from the second electrode plate.

In some examples, the first electrode plate, the second electrode plate, and the separator are all strip structures, and the first electrode plate, the second electrode plate, and the separator are integrally wound around the central axis A to form a winding structure. The winding structure may be a cylindrical structure, a flat structure, or in other shapes. In some other examples, the electrode assembly 10 may alternatively be a laminated structure formed by laminating the first electrode plate, the separator, and the second electrode plate.

The first tab 11 may be part of the first electrode plate coated with no active material layer. The first tab 11 may be a positive electrode tab or a negative electrode tab.

The housing 20 is a hollow structure, and has a space formed inside it for accommodating the electrode assembly 10. The housing 20 may be of various shapes and sizes, such as a cuboid shape, a cylindrical shape, and a hexagonal prism shape. A shape of the housing may be determined according to a specific shape of the electrode assembly 10. For example, under the condition that the electrode assembly 10 is a cylindrical structure, a cylindrical housing may be selected; and under the condition that the electrode assembly 10 is a cuboid structure, a cuboid housing may be selected. Optionally, both the electrode assembly 10 and the housing 20 are cylindrical.

The housing 20 may be made of various materials, such as copper, iron, aluminum, stainless steel, and aluminum alloy, which are not particularly limited in the embodiments of this application.

The housing 20 may be positively charged, negatively charged, or uncharged.

The electrode terminal 30 may be disposed on the housing 20 in an insulating manner, or may be electrically connected to the housing 20. The embodiments of this application do not impose limitation thereon, provided that the positive electrode plate and the negative electrode plate are not connected.

The electrode terminal 30 may be directly connected to the first tab 11 so as to electrically connect the electrode terminal 30 and the first tab 11. For example, the electrode terminal 30 may be connected to the first tab 11 by bonding, abutting, clamping, welding, or other means.

Alternatively, the electrode terminal 30 may alternatively be indirectly connected to the first tab 11 through another conductive member so as to electrically connect the electrode terminal 30 and the first tab 11. For example, the conductive member may be connected to both the first tab 11 and the electrode terminal 30 so as to electrically connect the electrode terminal and the first tab 11.

The electrode terminal 30 may be used as an output electrode of the battery cell 7, which may electrically connect the battery cell 7 and an external circuit, so as to realize charge and discharge of the battery cell 7. Optionally, the electrode terminal 30 is configured to be connected to the busbar, so as to realize electrical connection between the battery cells 7.

The first through hole 323 may be provided in one, or may be provided in plurality.

During forming of the battery cell 7, the first through hole 323 may communicate the space outside the housing 20 with the inner space of the housing 20. When electrolyte injection is required, an electrolyte injection head of an electrolyte injection device presses against the electrode terminal 30, and then the electrolyte injection head injects electrolyte into the housing via the first through hole 323.

Opening the first through hole 323 for injecting the electrolyte on the electrode terminal 30 can reduce the deformation of the housing 20 during electrolyte injection, simplify the structure of the battery cell 7, and reduce the influence of the first through hole 323 on the strength of the housing 20.

In some embodiments, the first through hole 323 may also be applied to other processes, such as a formation process.

During forming of the battery cell 7, gas is generated in the housing 20, and the first through hole 323 may also be used for communicating with an external negative pressure device to extract the gas in the housing 20.

In some embodiments, the electrode assembly 10 includes a main body 12, a first tab 11, and a second tab 13, where the first tab 11 and the second tab 13 protrude from the main body 12. The first tab 11 is part of the first electrode plate coated with no active material layer, and the second tab 13 is part of the second electrode plate coated with no active material layer.

The first tab 11 and the second tab 13 may protrude from the same side of the main body 12, or may protrude from opposite sides respectively. For example, the first tab 11 is disposed at an end of the electrode assembly 10 facing the electrode terminal 30, and the second tab 13 is disposed at an end of the electrode assembly 10 facing away from the electrode terminal 30.

In some embodiments, the first tab 11 is wound in multiple turns around the central axis A of the electrode assembly 10, meaning that the first tab 11 includes multiple turns of tab layers. After the winding is completed, the first tab 11 is generally cylindrical, and there is a gap between two adjacent tab layers. In this embodiment of this application, the first tab 11 may be treated to reduce the gap between the tab layers, so as to facilitate the connection between the first tab 11 and another member. For example, in this embodiment of this application, the first tab 11 may be kneaded, so that end regions of the first tab 11 facing away from the main body 12 can be gathered together. A dense end surface is formed at the end of the first tab 11 facing away from the main body 12 by the kneading process, which reduces the gap between tab layers and facilitates the connection between the first tab 11 and another member. Alternatively, in this embodiment of this application, a conductive material may alternatively be filled between two adjacent tab layers, so as to reduce the gap between the tab layers.

In some embodiments, the second tab 13 is wound in multiple turns around the central axis A of the electrode assembly 10, meaning that the second tab 13 includes multiple turns of tab layers. For example, the second tab 13 has also been kneaded so as to reduce the gap between the tab layers of the second tab 13.

The central axis A of the electrode assembly 10 is a virtual straight line. The first electrode plate, the second electrode plate, and the separator can be wound on the basis of the central axis A.

In some embodiments, the housing 20 includes a cylinder 21 and a cover 22 connected to the cylinder 21. The cylinder 21 is disposed around the periphery of the electrode assembly 10. The cover 22 is provided with an electrode lead-out hole 221. The electrode terminal 30 is disposed in the electrode lead-out hole 221.

The cover 22 and the cylinder 21 may be integrally formed, meaning that the housing is an integrally formed component. Certainly, the cover 22 and the cylinder 21 may alternatively be two components provided separately, and then connected together by welding, riveting, bonding, or the like.

The electrode lead-out hole 221 runs through the cover 22 so as to lead out the electric energy in the electrode assembly 10 to the outside of the housing 20.

The central axis A is a virtual straight line. In some embodiments, the central axis A may pass through the electrode lead-out hole 221. The central axis A of the electrode assembly may or may not coincide with the axis of the electrode lead-out hole 221. In some other embodiments, the central axis A may alternatively not pass through the electrode lead-out hole 221.

The electrode terminal 30 is configured to work with the electrode lead-out hole 221 to cover the electrode lead-out hole 221. The electrode terminal 30 may or may not extend into the electrode lead-out hole 221 The electrode terminal 30 is fastened to the cover 22. The electrode terminal 30 may be integrally fastened to the outside of the cover 22, or may extend into the inside of the housing 20 through the electrode lead-out hole 221.

In some embodiments, the cylinder 21 is a circular cylinder, and the cover 22 is a circular plate-shaped structure. In some other embodiments, the cylinder 21 may be a square cylinder, and the cover 22 may be a square plate-shaped structure.

In some embodiments, the cover 22 and the cylinder 21 are integrally formed. In this way, the connecting process of the cover 22 and the cylinder 21 can be left out.

When the cover 22 and the cylinder 21 are electrically connected to a positive electrode or a negative electrode of the electrode assembly 10, it is precisely because of the joint between the cover 22 and the cylinder 21 being an integrated structure, resistance at the joint between the cover 22 and the cylinder 21 is small, thereby improving the current capacity. The cover 22 may be configured to be connected to an external component (for example, the busbar).

When the battery cell is subjected to external impact, the external component may pull the cover 22, so that the joint between the cover 22 and the cylinder 21 is subjected to the action of force. In the foregoing technical solution, the cover 22 and the cylinder 21 are integrated so as to enhance strength of the joint between the cover 22 and the cylinder 21 and reduce the risk of failure in the joint between the cover 22 and the cylinder 21.

In some embodiments, the housing 20 may be formed by a stretching process.

In some embodiments, the cylinder 21 has an opening 211 at an end facing away from the cover 22, and the battery cell 7 further includes a cover plate 50 for sealing the opening 211.

The cover plate 50 covers the opening of the cylinder 21 to seal the opening of the cylinder 21. The cover plate 50 may be various structures, for example, the cover plate 50 is a plate structure.

In some embodiments, the cover plate 50 may be a circular cover plate, a rectangular cover plate, a square cover plate, a hexagonal cover plate, or other shaped cover plates.

In some embodiments, the cover plate 50 is welded to the cylinder 21.

In some embodiments, the cover 22 is circular, and the electrode assembly 10 is cylindrical; and the central axis A coincides with the axis of the electrode lead-out hole 221. In this embodiment, it is not required that the central axis A completely coincides with the axis of the electrode lead-out hole 221, and there may be a deviation between the two that is allowed by the process.

In this embodiment, the electrode lead-out hole 221 is generally opened in the middle of the cover 22, and correspondingly, the electrode terminal 30 is also mounted in the middle of the cover 22. When a plurality of battery cells 7 are assembled into a group, the requirement for positioning accuracy of the electrode terminal 30 can be reduced, so as to simplify the assembly process.

For example, the axis of the electrode lead-out hole 221 coincides with the axis of the cover 22, and the cover 22 is an annular structure disposed around the axis of the electrode lead-out hole 221.

For example, the axis of the electrode terminal 30 coincides with the axis of the electrode lead-out hole 221.

In some other embodiments, the cover 22 may alternatively be rectangular, and the electrode assembly 10 is flat. The electrode lead-out hole 221 may be disposed near an end of the cover 22 in a length direction of the electrode lead-out hole 221.

In some embodiments, the axis of the first through hole 323 coincides with the axis of the electrode lead-out hole 221.

In some embodiments, the electrode assembly 10 further includes a second tab 13, where the second tab 13 is opposite in polarity to the first tab 11, and the second tab 13 is electrically connected to the cover 22.

The cover 22 itself may be used as one output electrode of the battery cell 7, thereby eliminating a conventional electrode terminal 30 and simplifying the structure of the battery cell 7. When a plurality of battery cells 7 are assembled into a group, the cover 22 may be electrically connected to the busbar. This not only can enlarge the current flow area, but also can make the structural design of the busbar more flexible.

In some embodiments, the cylinder 21 is configured to connect the second tab 13 and the cover 22, so that the second tab 13 and the cover 22 are electrically connected.

The cylinder 21 may be electrically connected to the second tab 13 directly, or may be electrically connected to the second tab 13 through other components. For example, the second tab 13 is electrically connected to the cylinder 21 through the cover plate 50.

The cover 22 and the electrode terminal 30 have different polarities. In this case, one of the cover 22 and the electrode terminal 30 may be used as a positive output electrode of the battery cell 7, and the other may be used as a negative output electrode of the battery cell 7. In this embodiment, the positive output electrode and the negative output electrode are disposed on the same side of the battery cell 7, which can simplify the connection process between a plurality of battery cells 7.

The cover 22 may be configured to electrically connect the busbar. The inventors attempted to open the first through hole in the cover. However, the first through hole reduces the connection area between the cover and the busbar, and reduces the current flow area between the cover and the busbar. As a result, it is difficult to satisfy the requirements of the battery cell for the current capacity and temperature rise control during fast charge. Therefore, the inventors opened the first through hole 323 for electrolyte injection in the electrode terminal 30, so as to raise the connection area between the cover 22 and the busbar.

In some embodiments, the first tab 11 is disposed at an end of the electrode assembly facing the electrode terminal 30, and the second tab 13 is disposed at an end of the electrode assembly 10 facing away from the electrode terminal 30.

The first tab 11 and the second tab 13 are respectively disposed at two opposite ends of the electrode assembly 10, so that the distance between the first tab 11 and the second tab 13 can be increased so as to reduce the risk of conduction between the first tab 11 and the second tab 13 and enhance the safety.

In some embodiments, the second tab 13 is a negative electrode tab, and a substrate material of the housing 20 is steel. The substrate material is a main component in the material composition of the housing 20.

The housing 20 is electrically connected to the negative electrode tab, meaning that the housing 20 is in a low potential state. The steel housing 20 is not easily corroded by the electrolyte in a low potential state.

The electrode lead-out hole 221 in this embodiment of this application is made after the housing 20 is stretched and formed.

The inventors have tried to roll the opening end of the cylinder so that the opening end of the cylinder is turned inward to form a flanging structure, and the flanging structure presses the cover plate to fasten the cover plate. The inventors mounted the electrode terminal on the cover plate, and used the flanging structure and the electrode terminal as the two output electrodes of the battery cell. However, the larger the dimension of the flanging structure is, the higher the risk of curling and wrinkling after forming is. Under the condition that the flanging structure curls and wrinkles, the surface of the flanging structure becomes uneven, and when the flanging structure is welded to an external busbar, there will be a problem of poor welding. Therefore, the dimension of the flanging structure is relatively limited, resulting in insufficient current capacity of the battery cell.

In this embodiment, the electrode lead-out hole 221 for mounting the electrode terminal 30 is formed on the cover 22 by a hole-opening process, so that the positive output electrode and the negative output electrode are disposed at the end of the battery cell 7 facing away from the opening of the cylinder 21; and the cover 22 is formed during forming of the housing 20. The flatness can be ensured even after the electrode lead-out hole 221 is opened, and the connection strength between the cover 22 and the busbar is ensured. In addition, the flatness of the cover 22 is not restricted by its own dimension, and therefore the cover 22 can have a larger dimension, thereby improving the current capacity of the battery cell 7.

In some embodiments, the electrode terminal 30 is electrically connected to the first tab 11 through at least one first welding portion W1.

The electrode terminal 30 is welded to another member to form the first welding portion W1. Current is conducted between the electrode terminal 30 and the first tab 11 through the first welding portion W1.

In some examples, the electrode terminal 30 may be directly welded to the first tab 11 to form the first welding portion W 1. For example, part of the electrode terminal 30 and part of the first tab 11 are melted to form a molten pool, and the molten pool solidifies to form the first welding portion W1.

In some other alternative examples, the electrode terminal 30 is welded to another member connected to the first tab 11 (for example, current collecting member described below) to form the first welding portion W1. For example, part of the electrode terminal 30 and part of the current collecting member are melted to form a molten pool, and the molten pool solidifies to form the first welding portion W 1.

The embodiments of this application impose no special limitation on the shape, position, depth, and quantity of the first welding portion W1. For example, the first welding portion W1 may be rectilinear, C-shaped, annular, spiral, V-shaped, or in other shapes. The first welding portion W1 may be provided in one, or may be provided in plurality.

The first welding portion W1 can reduce the resistance between the electrode terminal and the first tab 11, improving the current capacity.

Figures 8, 9:
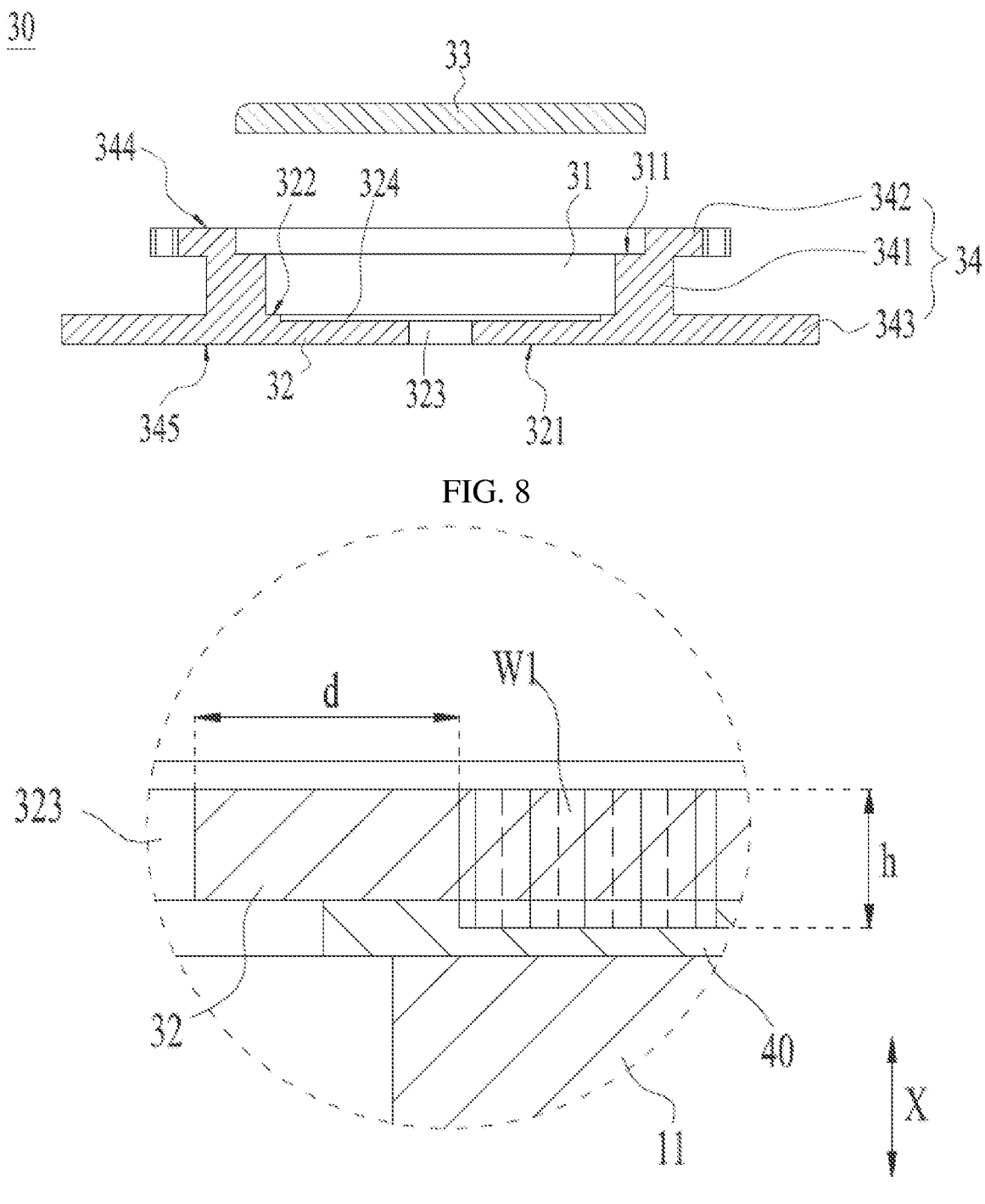
FIG. 8 is a schematic diagram of an electrode terminal of a battery cell according to some embodiments of this application.
FIG. 9 is an enlarged schematic diagram at circle C in FIG. 7.
Figure 10:
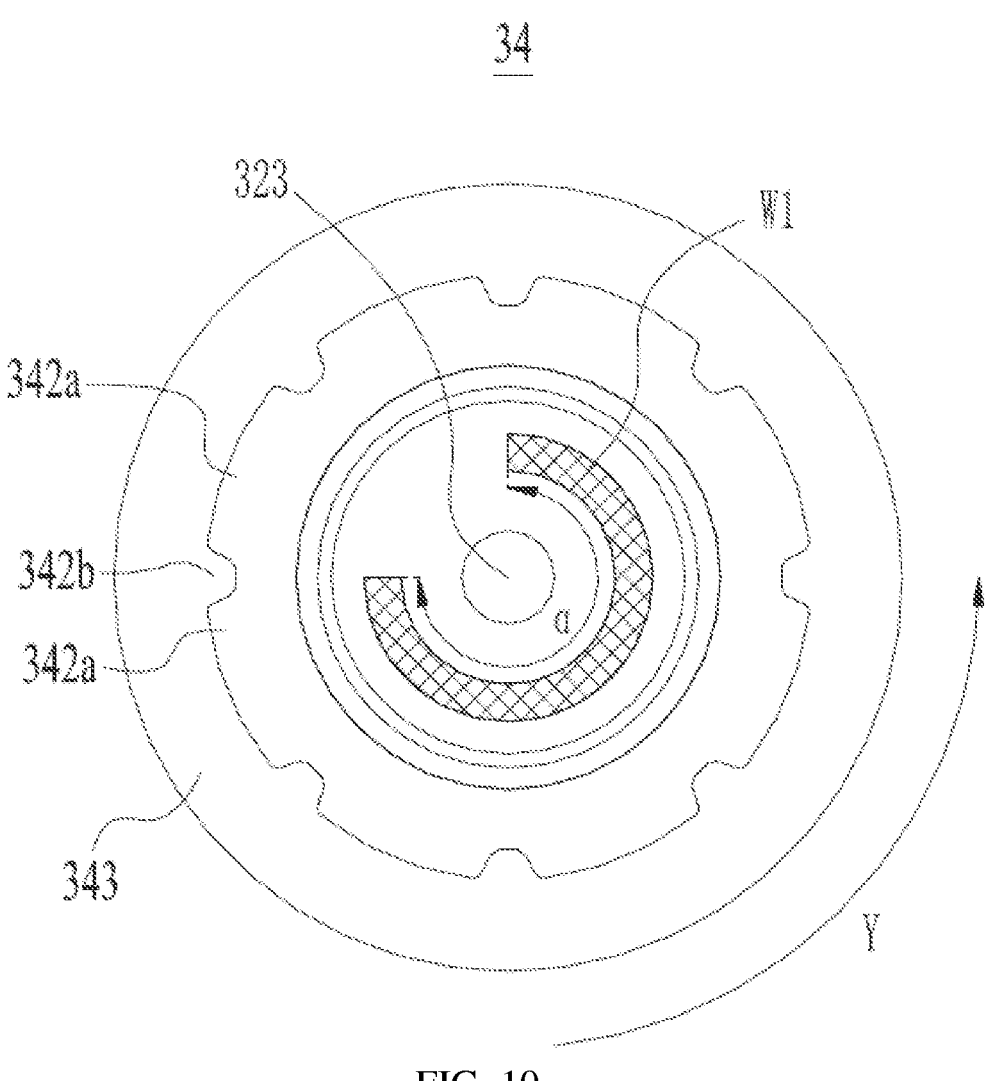
FIG. 10 is a schematic diagram of a terminal body of an electrode terminal of a battery cell according to some embodiments of this application.

FIG. 8 is a schematic diagram of an electrode terminal of a battery cell according to some embodiments of this application; FIG. 9 is an enlarged schematic diagram of FIG. 7 at circle C; and FIG. 10 is a schematic diagram of a terminal body of an electrode terminal of a battery cell according to some embodiments of this application.

Refer to FIG. 6 to FIG. 10 together. In some embodiments, the electrode terminal 30 includes a sealing plate 33 and a terminal body 34, where the terminal body 34 is provided with the first through hole 323, and the sealing plate 33 is connected to the terminal body 34 and configured to seal the first through hole 323.

After the processes related to the first through hole 323 are completed, the sealing plate 33 is connected to the terminal body 34 so as to reduce the risk of leakage of the electrolyte via the first through hole 323 and improve the sealing performance.

In some embodiments, the terminal body 34 includes a concave portion 31 and a connecting portion 32 located on a side of the concave portion 31 facing the electrode assembly 10, the first through hole 323 runs through the connecting portion 32, and the connecting portion 32 is electrically connected to the first tab 11 through at least one of the first welding portions W1. At least part of the sealing member 33 is accommodated in the concave portion 31.

The concave portion 31 may be recessed from a side of the terminal body 34 facing away from the electrode assembly 10 in a direction facing the electrode assembly 10. The connecting portion 32 is part of the terminal body 34 that corresponds to the bottom surface of the first concave portion 31.

The sealing plate 33 may be entirely located outside the concave portion 31, or may be partially accommodated in the first concave portion 31, provided that the sealing plate 33 can seal the first through hole 323.

The connecting portion 32 is welded to another member to form the first welding portion W1. For example, a welding device can irradiate laser on the surface of the connecting portion 32 facing the concave portion 31, part of the connecting portion 32 and part of a member inside the connecting portion 32 are melted through the laser to form a molten pool, and the molten pool solidifies to form the first welding portion W1.

In this embodiment of this application, opening the concave portion 31 on the terminal body 34 can reduce thickness of the connecting portion 32, thereby reducing welding power required for welding, reducing the risk of other components being burned, and enhancing safety. The concave portion 31 can also provide an accommodating space for the sealing plate 33, thereby reducing dimension of the sealing plate 33 protruding from the terminal body 34, reducing the space occupied by the electrode terminal 30, and increasing the energy density of the battery cell 7.

The sealing plate 33 can protect the connecting portion 32 from the outside, reducing external impurities entering the concave portion 31, reducing the risk of the connecting portion 32 being damaged by external impurities, and improving the sealing performance of the battery cell 7.

In some embodiments, thickness of the connecting portion 32 ranges from 0.5 mm to 10 mm.

In some embodiments, a gap is provided between the sealing plate 33 and the connecting portion 32, and the gap is used for avoiding the first welding portion W1.

The surface of the first welding portion W1 is uneven. Under the condition that the sealing plate 33 is pressed against the first welding portion W1, the sealing plate 33 vibrates during assembly, affecting the sealing effect. In this embodiment, a gap is provided between the sealing plate 33 and the connecting portion 32, so as to avoid the sealing plate 33 from the first welding portion W1, prevent direct contact between the sealing plate 33 and the first welding portion W1, reduce the shaking of sealing plate 33 in the assembly process, and ensure the sealing effect.

In some embodiments, a side wall of the concave portion 31 is provided with a stepped surface 311, at least part of the sealing plate 33 is accommodated in the concave portion 31, and the stepped surface 311 is configured to support the sealing plate 33.

The concave portion 31 is a stepped concave portion with the outer part larger than the inner part.

During assembly of the sealing plate 33, the stepped surface 311 can support the sealing plate 33 and position the sealing plate 33, thereby simplifying the assembly process, and a gap is formed between the sealing plate 33 and the connecting portion 32.

In some embodiments, the sealing plate 33 is welded to the side wall of the concave portion 31 to seal the opening of the concave portion 31 and the first through hole 323.

In some embodiments, the connecting portion 32 is provided with a groove 324 recessed from a first outer surface 322 of the connecting portion 32 in a direction facing the electrode assembly 10.

The connecting portion 32 has the first outer surface 322 and a first inner surface 321 that are oppositely disposed in a thickness direction of the connecting portion 32, the first inner surface 321 faces the electrode assembly 10, and the first outer surface 322 faces away from the electrode assembly 10. Optionally, the first outer surface 322 and the first inner surface 321 are both flat. The groove 324 is recessed with respect to the first outer surface 322 in a direction facing the electrode assembly 10.

A portion between the bottom wall of the groove 324 and the first inner surface 321 is configured to weld to another member to form the first welding portion W 1.

In this embodiment, the groove 324 is opened on the connecting portion 32 to form a stepped structure on the connecting portion 32. The first outer surface 322 and the bottom wall of the groove 324 have a gap formed.

During production of the battery cell 7, an external device needs to cooperate with the connecting portion 32. The surface of the first welding portion W1 is uneven, and under the condition that the external device is pressed on the first welding portion W1, the external device is easily crushed by the first welding portion W1. In this embodiment, with the groove 324 provided, a gap between the first outer surface 322 and the bottom wall of the groove 324 is formed, so that the first outer surface 322 can be configured to support the external device to separate the external device from the first welding portion W1, reducing the risk of the external device being crushed.

For example, the external device may be an electrolyte injection device, an air extraction device, a welding device, or other devices used for the battery cell 7.

For example, during electrolyte injection, the electrolyte injection head presses against the first outer surface 322, so that the first outer surface 322 can support the electrolyte injection head and cooperate with the electrolyte injection head to achieve sealing, reducing the risk of electrolyte leakage to the outside of the battery cell 7.

In some embodiments, the terminal body 34 has a second outer surface 344 and a second inner surface 345 that are oppositely disposed. The second inner surface 345 faces the electrode assembly 10, and the second outer surface 344 faces away from the electrode assembly 10. The concave portion 31 is recessed from the second outer surface 344 in a direction facing the electrode assembly 10 to the first outer surface 322 of the connecting portion 32.

In some embodiments, the sealing plate 33 may be configured to be welded to the busbar of the battery. In the battery, the busbar may connect the sealing plate 33 of one battery cell 7 and the cover 22 of another battery cell 7 to connect the two battery cells 7 in series.

In some embodiments, at least part of the sealing plate 33 protrudes from the second outer surface 344 of the terminal body 34.

When it is necessary to weld the busbar and the sealing plate 33, the busbar is fitted to an upper surface of the sealing plate 33 (that is, the outer surface of the sealing plate 33 facing away from the connecting portion 32) first, and the busbar is then welded to the sealing plate 33.

At least part of the sealing plate 33 protrudes from the second outer surface 344, so as to prevent the second outer surface 344 from obstructing fitting of the sealing plate 33 and the busbar, ensuring the tight fit between the busbar and the sealing plate 33.

In some embodiments, the connecting portion 32 is disposed at an end of the terminal body 34 facing the electrode assembly 10, and the first inner surface 321 of the connecting portion 32 is flush with the second inner surface 345.

The second inner surface 345 is a surface of the terminal body 34 facing the electrode assembly 10. The first inner surface 321 of the connecting portion 32 constitutes part of the second inner surface 345. In this way, the terminal body 34 may be fitted to the current collecting member with a flat-plate structure. In this embodiment, provided that the current collecting member is fitted to the second inner surface 345, the connecting portion 32 and the current collecting member can be fitted together, so as to facilitate the welding of the connecting portion 32 and the current collecting member.

In some embodiments, the terminal body 34 includes a columnar portion 341, a first restraint member 342, and a second restraint member 343, at least part of the columnar portion 341 is located in the electrode lead-out hole 221, and the concave portion 31 is disposed in the columnar portion 341, the first restraint member 342 and the second restraint member 343 are both connected to and protrude from the outer lateral wall of the columnar portion 341, and the first restraint member 342 and the second restraint member 343 are disposed on the outside and inside of the cover 22 respectively and together are configured to clamp part of the cover 22.

The first restraint member 342 being disposed on the outside of the cover 22 means that the first restraint member 342 is disposed on the side of the cover 22 facing away from the electrode assembly 10; and the second restraint member 343 being disposed on the inside of the cover 22 means that the second restraint member 343 is disposed on the side of the cover 22 facing the electrode assembly 10.

In the thickness direction of the cover 22, at least part of the first restraint member 342 overlaps with the cover 22, and at least part of the second restraint member 343 overlaps with the cover 22. The columnar portion 341 runs through the electrode lead-out hole 221 to connect the first restraint member 342 and the second restraint member 343 that are located on two sides of the cover 22 respectively.

The first restraint member 342 and the second restraint member 343 clamp the part of the cover 22 from two sides, so as to fix the terminal body 34 to the cover 22. The first restraint member 342 and the second restraint member 343 may directly clamp the cover 22, or may indirectly clamp the cover 22 through other components.

Optionally, the columnar portion 341 is cylindrical. the first restraint member 342 and the second restraint member 343 are both annular structures surrounding the columnar portion 341.

In some embodiments, the battery cell 7 further includes a first insulating member 60 and a second insulating member 70, at least part of the first insulating member 60 is disposed between the first restraint member 342 and the cover 22, and at least part of the second insulating member 70 is disposed between the second restraint member 343 and the cover 22. The first insulating member 60 and the second insulating member 70 are used for insulating the terminal body 34 from the cover 22.

The first insulating member 60 and the second insulating member 70 are both annular structures disposed around the columnar portion 341.

The first insulating member 60 can insulate the first restraint member 342 from the cover 22, and the second insulating member 70 can insulate the second restraint member 343 from the cover 22.

In some embodiments, one of the first insulating member 60 and the second insulating member 70 separates the columnar portion 341 from the cover 22. For example, part of the first insulating member 60 extends into the electrode lead-out hole 221 to separate the hole wall of the electrode lead-out hole 221 from the columnar portion 341.

In some embodiments, the first insulating member 60 and the second insulating member 70 are integrally formed structures. Alternatively, in some other embodiments, the first insulating member 60 and the second insulating member 70 are provided separately and abut against each other.

In some embodiments, one of the first insulating member 60 and the second insulating member 70 is configured to seal the electrode lead-out hole 221. In some examples, the first restraint member 342 and the cover 22 press the first insulating member 60, and the first insulating member 60 compresses and seals the electrode lead-out hole 221 from the outside. In some other examples, the second restraint member 343 and the cover 22 press the second insulating member 70, and the second insulating member 70 compresses and seals the electrode lead-out hole 221 from the inside.

In some embodiments, the battery cell 7 further includes a sealing ring 80, where the sealing ring 80 is sleeved on the columnar portion 341 and configured to seal the electrode lead-out hole 221. Optionally, part of the sealing ring 80 extends into the electrode lead-out hole 221 to separate the hole wall of the electrode lead-out hole 221 from the columnar portion 341.

In some embodiments, the periphery of the first restraint member 342 is provided with a plurality of protruding structures 342a, and the plurality of protruding structures 342*a* are disposed at intervals in the circumferential direction of the columnar portion 341.

Optionally, the plurality of protruding structures 342*a* may be disposed at equal intervals in the circumferential direction of the columnar portion 341.

The first restraint member 342 is a flanging structure formed by turning the end of the terminal body 34 outward that faces away from the electrode assembly 10.

Before the terminal body 34 is assembled into the housing 20, the first restraint member 342 of the terminal body 34 is generally a cylindrical structure and located at the upper end of the columnar portion 341, and the outer lateral wall of the first restraint member 342 is flush with the outer lateral wall of the columnar portion 341. During assembly of the terminal body 34 and the housing 20, the first restraint member 342 threads through the electrode lead-out hole 221, and the first restraint member 342 is squeezed, so that the first restraint member 342 is folded outwards, and the terminal body 34 is riveted to the cover 22.

Before the first restraint member 342 is folded, the upper end of the first restraint member 342 is provided with a plurality of groove structures 342*b* disposed at intervals. After the first restraint member 342 is folded, a plurality of protruding structures 342*a* disposed at intervals in the circumferential direction of the columnar portion 341 are formed, where the groove structure 342*b* is formed between the adjacent protruding structures 342*a*. In this embodiment, the groove structure 342*b* and the protruding structure 342*a* are provided to reduce the difficulty of folding the first restraint member 342 and reduce the stress concentration on the first restraint member 342.

In some embodiments, the second restraint member 343 is a restraint structure formed by pressing the end of the terminal body 34 facing the electrode assembly 10 so that the end of the terminal body 34 facing the electrode assembly 10 extends outward. During assembly of the cover 22 and the terminal body 34, the external device can squeeze an end of the terminal body 34 facing the electrode assembly 10, and the end of the terminal body 34 facing the electrode assembly 10 extends outward under the action of pressure to form the protruding second restraint member 343.

In some embodiments, the battery cell 7 further includes a current collecting member for electrically connecting the electrode terminal 30 and the first tab 11.

The current collecting member 40 electrically connects the first tab 11 to the first electrode terminal 30. The embodiments of this application do not impose limitation on the connection method between the first tab 11 and the current collecting member 40. For example, the current collecting member 40 may be connected to the first tab 11 by welding, abutting, or bonding.

The current collecting member 40 and the electrode terminal 30 are welded to form at least one first welding portion W1.

For example, the current collecting member 40 and the connecting portion 32 are welded to form at least one first welding portion W 1. When the connecting portion 32 and the current collecting member 40 are welded, the first through hole 323 can release the welding stress and reduce the risk of the connecting portion 32 being broken.

In some embodiments, in a thickness direction of the connecting portion 32, the first welding portion W1 extends from a side of the connecting portion 32 facing away from the current collecting member 40 at least to the inside of the current collecting member 40.

During welding, for example, when the electrode assembly 10 and the current collecting member 40 are mounted in the housing 20, and the current collecting member 40 is pressed against the connecting portion 32, an external welding device can weld the connecting portion 32 and the current collecting member 40 on the side of the connecting portion 32 facing away from the current collecting member 40 to form the first welding portion W1. The first welding portion W1 is exposed on a surface of the connecting portion 32 facing away from the current collecting member 40.

The first welding portion W1 may run through the current collecting member 40. For example, the first welding portion W1 runs through the current collecting member 40 and the connecting portion 32, and the first welding portion W1 is exposed on the surface of the current collecting member 40 facing away from the connecting portion 32. Certainly, the first welding portion W1 may not run through the current collecting member 40, meaning that the first welding portion W1 is not exposed on the surface of the current collecting member 40 facing away from the connecting portion 32.

The first welding portion W1 extends from the connecting portion 32 to the inside of the current collecting member 40 to connect the current collecting member 40 and the connecting portion 32, reducing contact resistance between the current collecting member 40 and the electrode terminal 30, and improving the current capacity.

In some embodiments, in the thickness direction of the connecting portion 32, the first welding portion W1 does not protrude beyond a surface of the current collecting member 40 facing away from the connecting portion 32.

In the foregoing technical solution, the first welding portion W1 is spaced a predetermined distance from the surface of the current collecting member 40 facing away from the connecting portion 32, so as to prevent the current collecting member 40 from being melted through, reduce the risk of metal particles being generated on the surface of the current collecting member 40 facing away from the connecting portion 32, and enhance safety.

In some embodiments, the current collecting member 40 is welded to the first tab 11 to form a second welding portion W2.

During assembly of the battery cell 7, the first tab 11 of the electrode assembly 10 may be welded to the current collecting member 40 first, and then the electrode assembly 10 and the current collecting member 40 are put into the housing 20. Specifically, during welding of the first tab 11 and the current collecting member 40, the current collecting member 40 may be pressed against the flattened end surface of the first tab 11 first, and an external welding device then emits laser on a surface of the current collecting member 40 facing away from the first tab 11. The current collecting member 40 and the first tab 11 are welded through the laser.

The shape of the second welding portion W2 may be rectilinear, C-shaped, annular, spiral, V-shaped, or in other shapes, which is not limited in the embodiments. The second welding portion W2 may be provided in one, or may be provided in plurality.

The second welding portion W2 can reduce the contact resistance between the current collecting member 40 and the first tab 11, improving the current capacity.

In some embodiments, the current collecting member 40 has a convex portion 41 on a side facing the first tab 11, and the convex portion 41 is welded to the first tab 11 to form the second welding portion W2.

During assembly of the current collecting member 40 and the electrode assembly 10, the convex portion 41 of the current collecting member 40 is pressed against the first tab 11 first, and then the convex portion 41 and the first tab 11 are welded. The convex portion 41 can be better fitted to the first tab 11, reducing the risk of poor welding.

In some embodiments, the convex portion 41 may be pressed against the first tab 11 and be embedded into the first tab 11.

In some embodiments, except for the convex portion 41, other portions of the current collecting member 40 are generally flat-plate structures.

In some embodiments, the current collecting member 40 forms a concave structure 44 at a position corresponding to the convex portion 41, where the concave structure 44 is recessed with respect to the surface of the current collecting member 40 facing away from the first tab 11 in the direction facing the first tab 11. A transition portion is formed between a bottom surface of the concave structure 44 and a top surface of the convex portion 41, and the transition portion is welded to the first tab 11 to form the second welding portion W2. The concave structure 44 may be provided to reduce thickness of the transition portion, so as to reduce the welding power required for welding the transition portion and the first tab 11, reduce heat generated, and reduce the risk of the electrode assembly 10 being burned.

The second welding portion W2 is formed by welding, where the surface thereof is uneven. In this embodiment, the concave structure 44 is provided to make the surface of the second welding portion W2 be recessed with respect to the surface of the current collecting member 40 facing away from the first tab 11, so as to insulate the second welding portion W2 from other components (for example, the electrode terminal 30).

In some embodiments, the first welding portion W1 is provided in one, and the first welding portion W1 extends in a circumferential direction of the first through hole 323 and surrounds at least part of the first through hole 323.

The first welding portion W1 may be an annular structure or a semi-annular structure. The dimension of the first welding portion W1 extending in the circumferential direction Y may be determined according to the requirements of the battery cell 7 for the current capacity, which is not particularly limited in the embodiments.

The first welding portion W1 can enhance the strength of a region of the electrode terminal 30 around the first through hole 323, and reduce the deformation of the electrode terminal 30 under the shock of the electrolyte.

In some embodiments, the first welding portion W1 surrounds only part of the first through hole 323 in the circumferential direction Y of the first through hole 323.

One part of the first through hole 323 is surrounded by the first welding portion W1 in the circumferential direction Y of the first through hole 323, and another part of the first through hole 323 is surrounded by the first welding portion W1 in the circumferential direction Y of the first through hole 323.

The periphery of the first through hole 323 is not sealed by the first welding portion W1, and a gap between the electrode terminal 30 and a member welded to the electrode terminal (for example, the current collecting member 40) is not blocked by the first welding portion W1, so that part of the electrolyte flowing in through the first through hole 323 can flow through the gap, thereby improving the efficiency of electrolyte injection.

In some embodiments, an angle at which the first welding portion W1 surrounds the first through hole 323 is $\alpha$, and $180° \leq \alpha \leq 360°$.

Optionally, $\alpha$ may be 180°, 225°, 270°, 315°, or 360°.

$\alpha$ is positively correlated with the current flow area of the first welding portion W1. The smaller $\alpha$ is, the smaller the current flow area of the first welding portion W1 is, and the higher the heat generated when current flows through the first welding portion W1 is. In this embodiment of this application, a is defined in the range of $180° \leq \alpha \leq 360°$, so that the first welding portion W1 satisfies the requirements of the battery cell 7 for the current capacity and temperature rise control.

Figure 11:
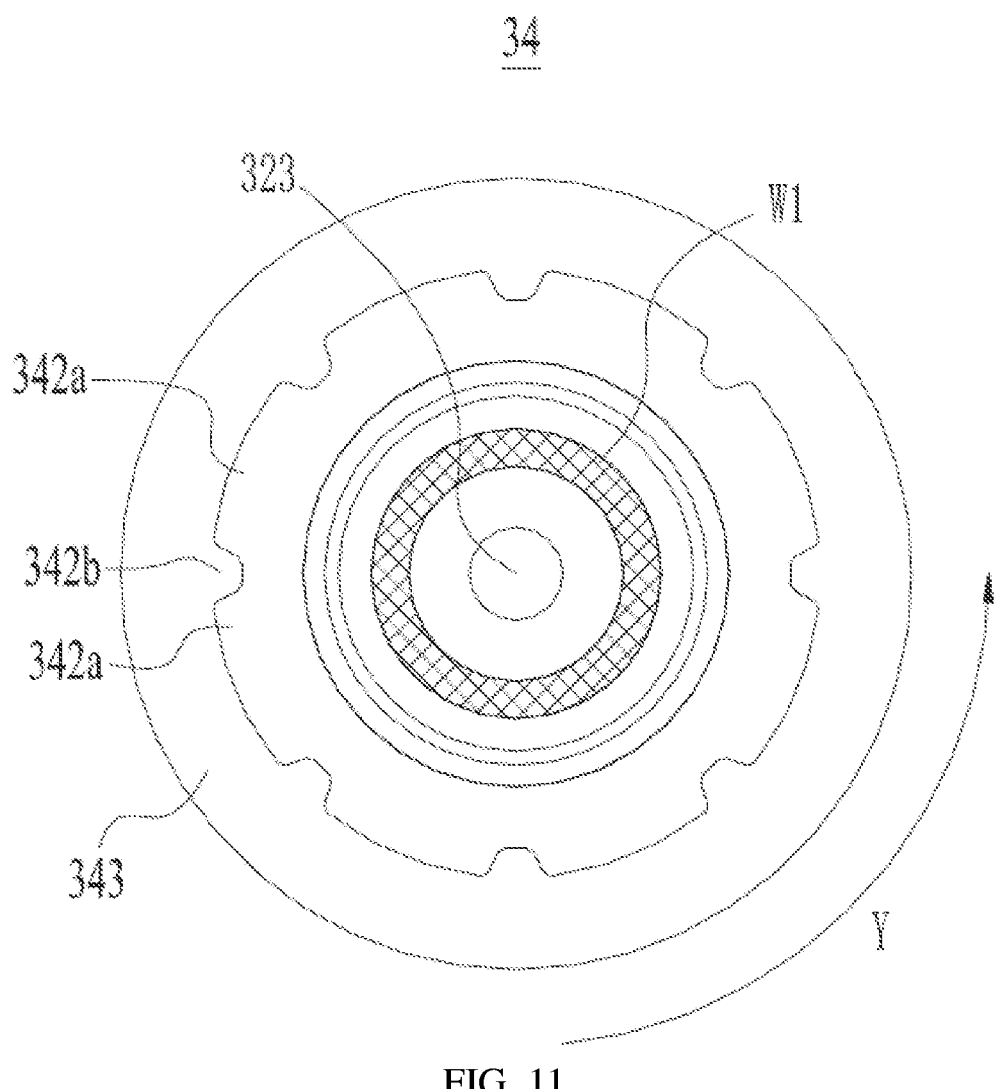
FIG. 11 is a schematic diagram of a terminal body of an electrode terminal of a battery cell according to some other embodiments of this application.

FIG. 11 is a schematic diagram of a terminal body of an electrode terminal of a battery cell according to some other embodiments of this application.

As shown in FIG. 11, in some embodiments, the first welding portion W1 surrounds the first through hole 323, in other words, a is 360°.

In this embodiment of this application, the current flow area of the first welding portion W1 can be increased, so that the first welding portion W1 satisfies requirements of the battery cell 7 for the current capacity and temperature rise control, the strength of the first welding portion W1 is enhanced, and the risk of tearing of the first welding portion W1 during vibration of the battery cell 7 is reduced.

Figure 12:
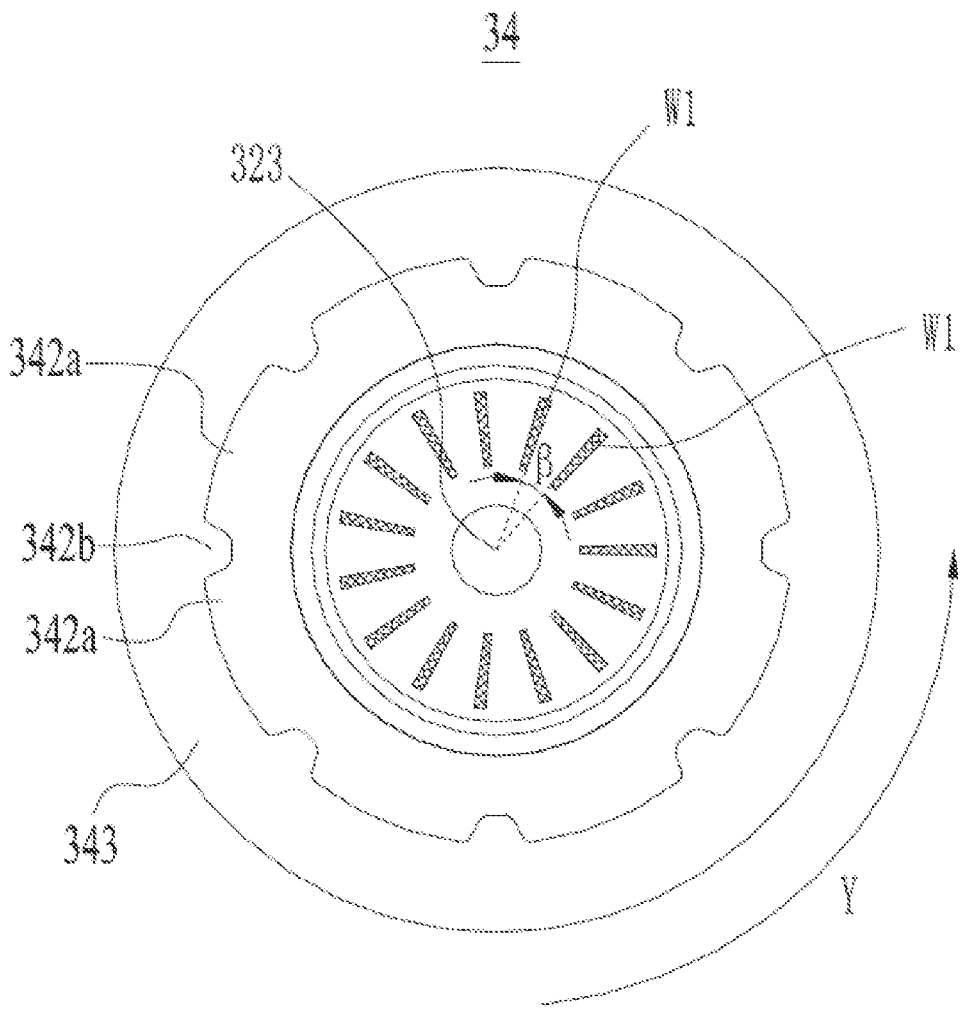
FIG. 12 is a schematic diagram of a terminal body of an electrode terminal of a battery cell according to still some other embodiments of this application.

FIG. 12 is a schematic diagram of a terminal body of an electrode terminal of a battery cell according to still some other embodiments of this application.

Refer to FIG. 6 to FIG. 9 and FIG. 12 together. In some embodiments, the first welding portion W1 is provided in plurality, and the plurality of first welding portions W1 are disposed at intervals in a circumferential direction Y of the first through hole 323.

The first welding portion W1 may extend in the circumferential direction Y of the first through hole 323, or may extend in the radial direction of the first through hole 323.

A spacing angle between two adjacent first welding portions W1 in the circumferential direction Y of the first through hole 323 is not particularly limited in the embodiments. The plurality of first welding portions W1 may be disposed at equal intervals in the circumferential direction Y of the first through hole 323, or may be disposed at unequal intervals.

On the premise that the total area is constant, compared with the solution of providing one first welding portion W1, this solution of providing the first welding portion W1 in plurality can reduce the power for once welding and the heat generated.

In some embodiments, a spacing angle $\beta$ between any two adjacent first welding portions W1 in the circumferential direction Y of the first through hole 323 is less than 30°.

The larger the value of the angle $\beta$ is, the more scattered the plurality of first welding portions W1 are, and the smaller the total current flow area of the plurality of first welding portions W1 is; and the smaller the value of the angle $\beta$ is, the more concentrated the plurality of first welding portions W1 are, and the larger the total current flow area of the plurality of first welding portions W1 is. In this embodiment of this application, $\beta$ is defined to be less than 30° so as to satisfy requirements of the battery cell 7 for current capacity and temperature rise control, and reduce the risk of tearing of the first welding portion W1 during vibration of the battery cell 7.

In some embodiments, each of the first welding portions W1 extends in the radial direction of the first through hole 323.

That the first welding portion W1 extends in the radial direction of the first through hole 323 means that dimension of the first welding portion W1 in the radial direction of the first through hole 323 is larger than dimension of the first welding portion W1 in the circumferential direction Y of the first through hole 323.

The first welding portion W1 extends in the radial direction of the first through hole 323, so that the dimension of the first welding portion W1 in the circumferential direction Y of the first through hole 323 can be reduced, and more first welding portions W1 can be arranged on the periphery of the first through hole 323 for the electrode terminal 30, thereby improving the current capacity and reducing heat generated.

In some embodiments, depth of the first welding portion W1 in the axial direction of the first through hole 323 is h; and minimum distance between the first welding portion W1 and the first through hole 323 in the radial direction of the first through hole 323 is d. d and h satisfy $0.1 \leq h/d \leq 0.6$.

Due to process errors, different regions of the first welding portion W1 may have different welding penetrations in the axial direction X of the first through hole 323. h may be a dimension of a region of the first welding portion W1 with the lowest welding penetration in the axial direction X of the first through hole 323.

The larger the h is, the greater the power required for welding is, the higher the heat generated during welding is, the greater the heat stress acting on a region close to the first through hole 323 is, and the greater the degree of deformation of the first through hole 323 is. The smaller the d is, the more the heat conducted to a region close to the first through hole 323 during welding is, the greater the heat stress acting on a region close to the first through hole 323 is, and the greater the degree of deformation of the first through hole 323 is. Under the condition that the h/d is too large, the first through hole 323 is severely deformed, and an electrolyte injection head is difficult to fit to the first through hole 323, which affects the electrolyte injection efficiency. The inventors found through intensive study and numerous experiments that the value of h/d being defined to be less than or equal to 0.6 can reduce the larger heat stress acting on the region close to the first through hole 323, reduce the deformation of the first through hole 323, and facilitate the fitting of the electrolyte injection head and the first through hole 323.

The smaller the h is, the lower the current capacity and strength of the first welding portion W1 are, and the higher the risk of tearing of the first welding portion W1 during vibration of the battery cell 7 is. The larger the d is, the smaller the area of a region of the electrode terminal 30 that can be used for welding is, and the more restrained the current capacity and strength of the first welding portion W1 is. Under the condition that h/d is too small, the current capacity and strength of the first welding portion W1 will be insufficient. The inventors found through intensive study and numerous experiments that when the value of h/d is defined to be greater than or equal to 0.1, the current capacity and strength of the first welding portion W1 satisfy the requirements.

Optionally, a value of h/d may be 0.1, 0.2, 0.3, 0.4, 0.5, or 0.6.

In some embodiments, d and h satisfy $0.2 \leq h/d \leq 0.5$. The inventors found through intensive study and numerous experiments that when $0.2 \leq h/d \leq 0.5$, the deformation of the first through hole 323 can be effectively reduced, so that the current capacity and strength of the first welding portion W1 satisfy the requirements.

In some embodiments, $1.6 \text{ mm} \leq d \leq 5.5 \text{ mm}$.

Under the condition that d is too small, too much heat is conducted to the region close to the first through hole 323 during welding, the heat stress acting on the region close to the first through hole 323 is too large, the deformation of the first through hole 323 is serious, and the electrolyte injection head is difficult to fit to the first through hole 323, which affects the electrolyte injection efficiency. Under the condition that d is too large, an area of the electrode terminal 30 that can be used for welding is relatively small, and the current capacity and strength of the first welding portion W1 are insufficient.

The inventors found through intensive study and numerous experiments that defining the value of d in the range of 1.6 mm to 5.5 mm can reduce the deformation of the first through hole 323, facilitate the fitting of the electrolyte injection head and the first through hole 323, and enable the current capacity and strength of the first welding portion W1 to satisfy the requirements.

Optionally, d is 1.6 mm, 2 mm, 3 mm, 4 mm, 5 mm, or 5.5 mm.

In some embodiments, h ranges from 0.8 mm to 1.0 mm.

In some embodiments, the electrode assembly 10 is a winding structure, and the electrode assembly 10 has a second through hole 14 at the winding center. The first through hole 323 communicates with the second through hole 14, so that an electrolyte injected through the first through hole 323 is capable of flowing into the second through hole 14.

For example, the electrode assembly 10 is manufactured by winding the first electrode plate, the second electrode plate, and the separator on a winding tool, and after the winding is completed, the winding tool is pulled out from the electrode assembly 10. After the winding tool is pulled out, the second through hole 14 is formed in the middle of the electrode assembly 10. The second through hole 14 runs through the first tab 11, the main body 12, and the second tab 13.

In the axial direction X of the first through hole 323, the first through hole 323 and the second through hole 14 may overlap or may not overlap.

The embodiments of this application do not impose any special limitation on the size relationship between the diameter of the first through hole 323 and the diameter of the second through hole 14.

In the electrolyte injection process, the electrolyte can flow into the second through hole 14 via the first through hole 323, and the electrolyte flowing into the second through hole 14 can infiltrate the electrode assembly 10 from the inside, thereby improving the infiltration efficiency of the electrode assembly 10.

In some embodiments, the axial direction X of the first through hole 323 is parallel to the axial direction of the second through hole 14.

In some embodiments, in the axial direction X of the first through hole 323, a projection of the first through hole 323 at least partially overlaps with a projection of the second through hole 14.

The first through hole 323 and the second through hole 14 are opposite in the axis direction X of the first through hole 323, and part of the electrolyte flowing through the first through hole 323 can enter the second through hole 14 without changing the flow direction, thereby improving the infiltration efficiency of the electrode assembly 10.

Optionally, when the first through hole 323 is a variable diameter hole, a projection of the first through hole 323 in its own axial direction X is a projection of an opening at the inner end of the first through hole 323 in its own axial direction X. When the second through hole 14 is a variable diameter hole, a projection of the second through hole 14 in the axial direction X of the first through hole 323 is a projection of an opening of the second through hole 14 near the end of the first through hole 323 in the axial direction X of the first through hole 323.

In some embodiments, in the axial direction of the first through hole 323, a projection of the second through hole 14 is larger than a projection of the first through hole 323.

An area of a projection of the first through hole 323 in the axial direction X of the first through hole 323 is S1, and an area of a projection of the second through hole 14 in the axial direction X of the first through hole 323 is S2, where S2 is larger than S1.

The second through hole 14 has a larger cross-sectional area than the first through hole 323. This allows the second through hole 14 to contain more electrolyte, which helps to increase the efficiency of the electrolyte infiltrating the electrode assembly 10 from the inside.

In some embodiments, in the axial direction X of the first through hole 323, a projection of the first through hole 323 falls within a projection of the second through hole 14.

In this embodiment, the solid part of the electrode assembly 10 can avoid the first through hole 323, which reduces the electrolyte directly shocking on the electrode assembly 10, and reduces the risk of deformation of the electrode assembly 10. For example, based on this embodiment of this application, the shock on the first tab 11 and the separator can be reduced, and the deformation of the first tab 11 and the separator can be reduced.

In some embodiments, diameter of the first through hole 323 is $D_1$, diameter of the second through hole 14 is $D_2$, and $D_1$ and $D_2$ satisfy $65\% \leq D_1/D_2 \leq 95\%$.

For example, $D_1$ refers to the minimum diameter of the first through hole 323 and $D_2$ refers to the minimum diameter of the second through hole 14.

The larger $D_1$ is, the higher the efficiency of the electrolyte injection is, the shorter the electrolyte injection time is, the less the volume of electrolyte that can be infiltrated in the electrode assembly 10 during electrolyte injection is, and the less the total volume of the electrolyte injected is. The smaller $D_2$ is, the smaller the area of a hole wall of the second through hole 14 is, and the lower the efficiency of the electrolyte infiltrating from the inside of the electrode assembly 10 is. Under the condition that the $D_1/D_2$ is too large, a volume of the electrolyte injected is relatively small, affecting the cycle life of the battery cell 7. The inventors found through intensive study and numerous experiments that when the value of $D_1/D_2$ is defined to be less than or equal to 95%, the electrolyte injection volume satisfies the requirement.

The smaller $D_1$ is, the lower the efficiency of electrolyte injection and the longer the electrolyte injection time are; and the larger $D_2$ is, the higher the efficiency of the electrolyte infiltrating from the inside of the electrode assembly 10 is. Under the condition that the $D_1/D_2$ is too small, an electrolyte injection time is relatively long, leading to relatively low production efficiency. In addition, the larger $D_2$ is, the smaller the capacity of the electrode assembly 10 is, the lower the utilization of the inner space of the battery cell 7 is, and the lower the energy density of the battery cell 7 is. The inventors found through intensive study and numerous experiments that when the value of $D_1/D_2$ is defined to be greater than or equal to 65%, the electrolyte injection efficiency is raised, and the loss of the energy density of the battery cell 7 due to the second through hole 14 is reduced.

Optionally, the value of $D_1/D_2$ may be 65%, 75%, 85%, or 95%.

In some embodiments, $D_2 \geq D_1 + 0.2$ mm.

During assembly of the battery cell 7, the electrode assembly 10 may be shifted due to assembly errors, causing the first through hole 323 to be opposite the solid part of the electrode assembly 10. As a result, the electrode assembly 10 is caused to be shocked by the electrolyte.

The inventors found through intensive study and numerous experiments that $D_2 \geq D_1 + 0.2$ mm being controlled can provide a deviation margin for the electrode assembly 10, reduce the risk that the solid part of the electrode assembly 10 is opposite the first through hole 323, reduce the risk of the electrolyte directly shocking the electrode assembly 10, and reduce the risk of deformation of the electrode assembly 10.

In some embodiments, the central axis of the first through hole 323 is parallel to the central axis of the second through hole 14. Optionally, the central axis of the first through hole 323 coincides with the central axis of the second through hole 14. For example, the central axis of the second through hole 14 may be used as the central axis A of the electrode assembly 10.

In some embodiments, the battery cell 7 further includes a current collecting member for electrically connecting the electrode terminal 30 and the first tab 11. The current collecting member 40 includes a third through hole 45, where the third through hole 45 is at least partially disposed between the first through hole 323 and the second through hole 14.

The embodiments do not impose any special limitation on the diameter of the third through hole 45, which may be greater than, smaller than, or equal to the space of the first through hole 323.

On the axial direction X of the first through hole 323, the third through hole 45 is opposite the first through hole 323, meaning that a projection of the third through hole 45 in the axial direction X of the first through hole 323 at least partially overlaps with a projection of the first through hole 323 in the axial direction X of the first through hole 323. On the axial direction X of the first through hole 323, the third through hole 45 is opposite the second through hole 14, meaning that the projection of the third through hole 45 in the axial direction X of the first through hole 323 at least partially overlaps with the projection of the second through hole 14 in the axial direction X of the first through hole 323.

The third through hole 45 is provided so that the current collecting member 40 can avoid the electrolyte flowing through the first through hole 323, reducing the blocking of the current collecting member 40 to the electrolyte in the electrolyte injection process. In this way, the electrolyte can smoothly flow through the third through hole 45 and flow into the second through hole 14, thereby improving the infiltration efficiency of the electrode assembly 10.

In some embodiments, the axial direction of the third through hole 45 is parallel to the axial direction X of the first through hole 323.

In some embodiments, the diameter of the third through hole 45 is greater than or equal to that of the first through hole 323. The diameter of the third through hole 45 is less than or equal to that of the second through hole 14.

In some embodiments, in the axial direction X of the first through hole 323, the projection of the third through hole 45 is less than the projection of the second through hole 14.

An area of the projection of the third through hole 45 in the axial direction X of the first through hole 323 is S3, where S2 is larger than S3. For example, the diameter of the third through hole 45 is less than that of the second through hole 14.

The second through hole 14 has a larger cross-sectional area than the third through hole 45. In this way, the electrolyte flowing through the third through hole 45 can quickly flow into the second through hole 14, helping improve the efficiency of the electrolyte infiltrating the electrode assembly 10 from the inside.

In some embodiments, in the axial direction of the first through hole 323, a projection of the third through hole 45 is larger than a projection of the first through hole 323. For example, the diameter of the third through hole 45 is greater than that of the first through hole 323.

The third through hole 45 has a larger cross-sectional area than the first through hole 323. In this way, the risk of the current collecting member 40 blocking the first through hole 323 can be reduced, the electrolyte can smoothly flow through the third through hole 45 and enter the second through hole 14, and the efficiency of the electrolyte infiltrating the electrode assembly from the inside can be improved.

In some embodiments, in the axial direction X of the first through hole 323, a projection of the first through hole 323 falls within a projection of the third through hole 45.

In this embodiment, not only the risk of the current collecting member 40 blocking the first through hole 323 can be reduced so that the electrolyte can smoothly flow into the housing 20, but also shocking on the current collecting member 40 can be reduced so that the risk of cracking at the joint between the current collecting member 40 and the electrode terminal can be reduced.

In some embodiments, in the axial direction X of the first through hole 323, a projection of the third through hole 45 falls within a projection of the second through hole 14. In this embodiment, the blocking of the solid part of the electrode assembly 10 to the third through hole 45 can be reduced, so that the electrolyte can flow into the second through hole 14 smoothly.

In some embodiments, the first through hole 323, the second through hole 14, and the third through hole 45 are arranged coaxially. The coaxial arrangement means that the central axis of the first through hole 323, the central axis of the second through hole 14, and the central axis of the third through hole 45 coincide. Certainly, the coincidence of the embodiments is not absolute coincidence, and errors in conventional engineering cognition are allowed.

With the three through holes arranged coaxially, the inflow of the electrolyte can be made smoother, and the shocking from the electrolyte to the current collecting member 40 and the electrode assembly 10 can be reduced.

In some embodiments, the diameter of the third through hole 45 is less than that of the second through hole 14, and the current collecting member 40 protrudes inwardly from the hole wall of the second through hole 14 in the radial direction of the second through hole 14. The current collecting member 40 may block the first tab 11, reducing the shocking from the electrolyte on the first tab 11.

Figure 13:
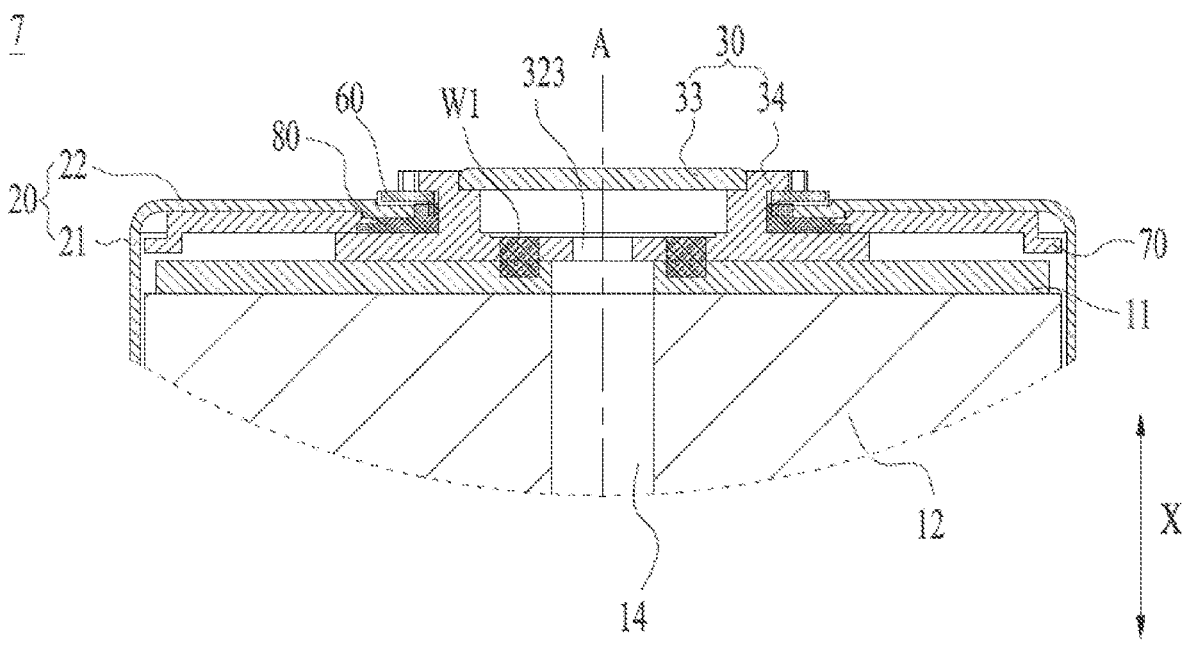
FIG. 13 is a partial schematic cross-sectional view of a battery cell according to some other embodiments of this application.

FIG. 13 is a partial schematic cross-sectional view of a battery cell according to some other embodiments of this application.

As shown in FIG. 13, in some embodiments, the electrode terminal 30 is welded to the first tab 11 to form the first welding portion W 1.

Compared with the battery cell shown in FIG. 6, the battery cell 7 shown in FIG. 13 can eliminate the current collecting member, thereby simplifying the internal structure of the battery cell 7, shortening the conductive path between the electrode terminal 30 and the first tab 11, and increasing the energy density of the battery cell 7.

Some embodiments of this application further provide a battery, including the battery cell according to any one of the foregoing embodiments.

Figure 14:
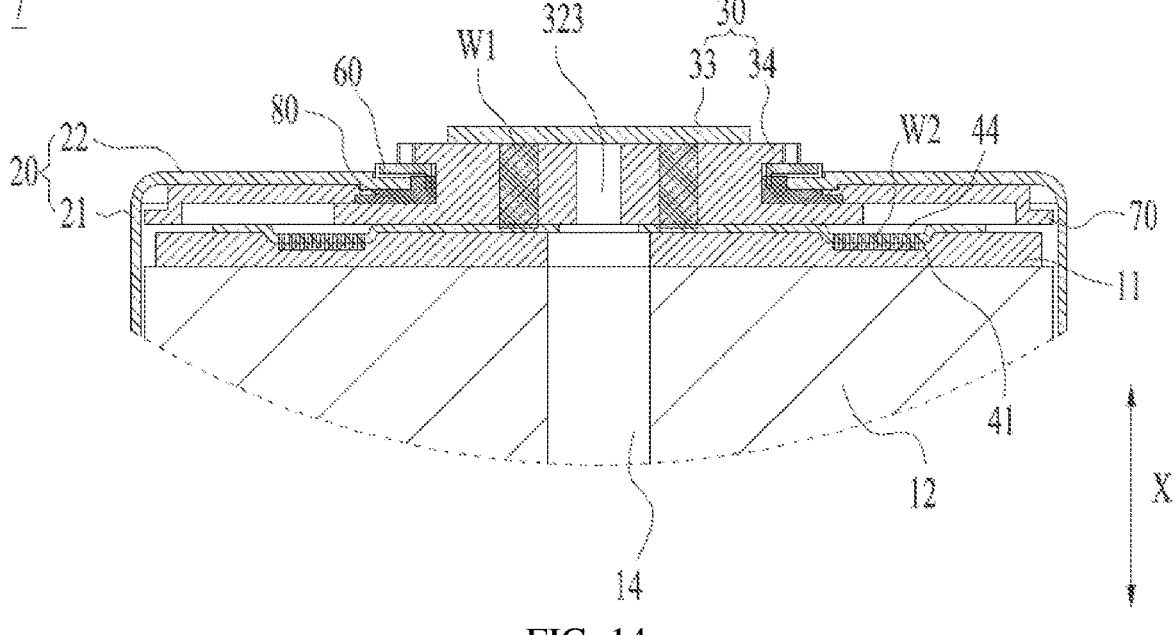
FIG. 14 is a partial schematic cross-sectional view of a battery cell according to some other embodiments of this application.

FIG. 14 is a partial schematic cross-sectional view of a battery cell according to some other embodiments of this application.

As shown in FIG. 14, in some embodiments, the concave portion of the electrode terminal 30 may be left out. For example, the first through hole 323 runs through the terminal body 34, and the terminal body 34 may not be provided with the concave portion 31 shown in FIG. 6. The sealing plate 33 may directly cover the terminal body 34 and seal the first through hole 323.

Figure 15:
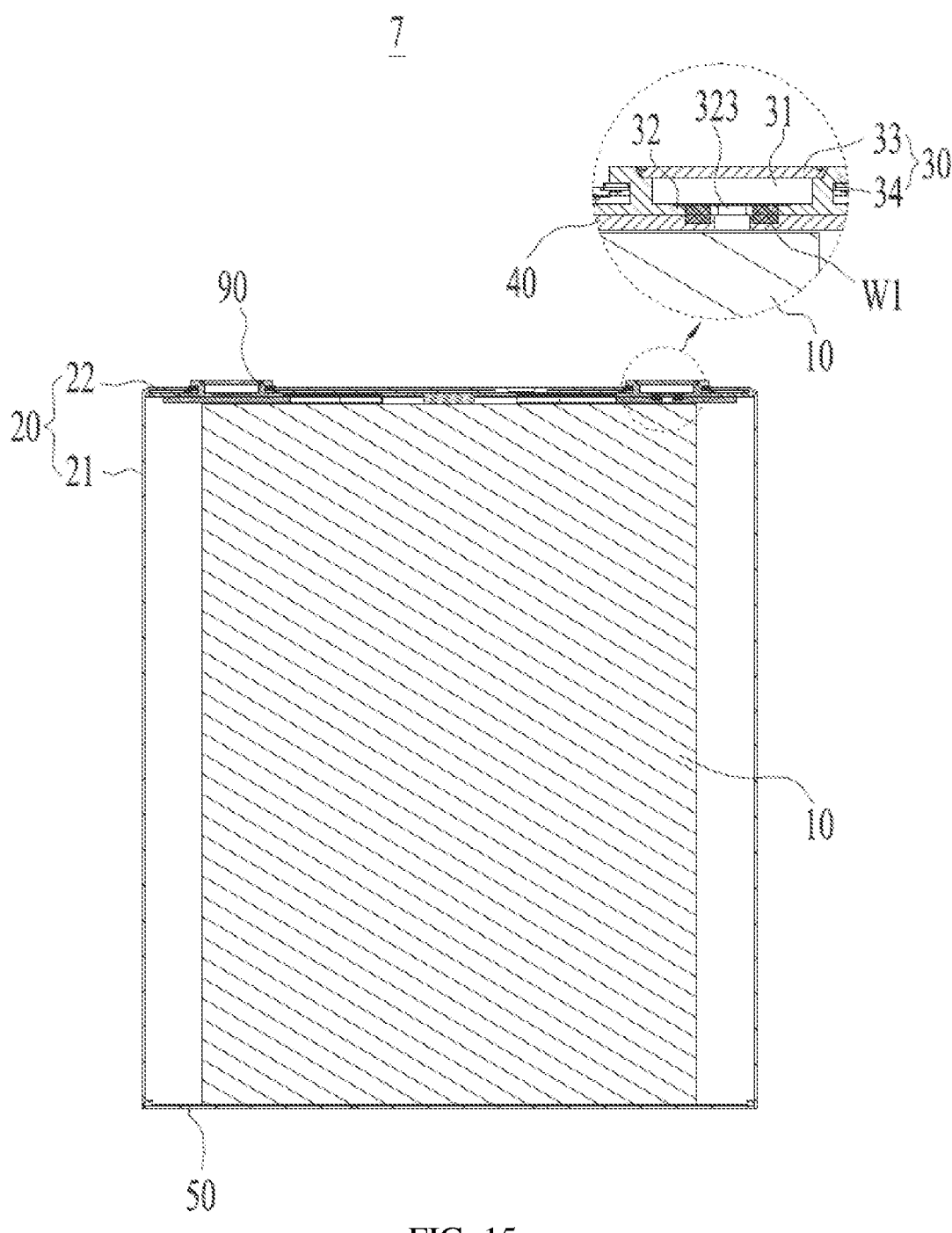
FIG. 15 is a schematic cross-sectional view of a battery cell according to some other embodiments of this application.

FIG. 15 is a schematic cross-sectional view of a battery cell according to some other embodiments of this application.

As shown in FIG. 15, in some embodiments, the battery cell 7 may be a prismatic battery cell.

In some embodiments, the housing 20 includes a cylinder 21 and a cover 22 formed integrally, where the cylinder 21 is disposed around the periphery of the electrode assembly 10. For example, the cylinder 21 may be a square cylinder.

The cylinder 21 has an opening at an end facing away from the cover 22, and the cover plate 50 covers the opening of the cylinder 21 to seal the opening of the cylinder 21. For example, the cover plate 50 is welded to the cylinder 21.

In some embodiments, the battery cell further includes a first electrode terminal 30 and a second electrode terminal 90 that have opposite polarities, where the first electrode terminal 30 is configured to be electrically connected to a first tab of the electrode assembly 10, and the second electrode terminal 90 is configured to be electrically connected to a second tab of the electrode assembly 10.

In some embodiments, the first electrode terminal 30 and the second electrode terminal 90 are mounted in the cover 22.

In the battery, a busbar connects electrode terminals of a plurality of battery cells, so as to connect the plurality of battery cells in series, in parallel, or in series-parallel. Both the first electrode terminal 30 and the second electrode terminal 90 can be configured to be connected to the busbar.

When the battery is subjected to an external impact, the busbar pulls the cover 22 through the first electrode terminal 30 and the second electrode terminal 90, so that the joint between the cover 22 and the cylinder 21 is subjected to the action of force. Under the condition that the cover 22 and the cylinder 21 are separate structures, for example, the cover 22 and the cylinder 21 are connected by welding, the joint between the cover 22 and the cylinder 21 may fail under the action of force. In this embodiment of this application, the cover 22 and the cylinder 21 are integrated so as to enhance the strength of the joint between the cover 22 and the cylinder 21 and reduce the risk of failure in the connection between the cover 22 and the cylinder 21.

In some embodiments, the housing 20 is neither electrically connected to a positive electrode of the electrode assembly, nor is electrically connected to a negative electrode of the electrode assembly. In other words, the housing 20 is not charged.

In some embodiments, the first tab and second tab of the electrode assembly 10 are located on a same side of the electrode assembly facing the cover 22.

In some embodiments, the first through hole 323 may be opened on the first electrode terminal 30.

Some embodiments of this application further provide an electric apparatus, including the battery cell according to any one of the foregoing embodiments, where the battery cell is configured to provide electric energy. The electric apparatus may be any one of the foregoing devices or systems using a battery cell.

Refer to FIG. 4 to FIG. 7. Some embodiments of this application provide a cylindrical battery cell 7, including an electrode assembly 10, a housing 20, an electrode terminal 30, a current collecting member 40, and a cover plate 50.

The housing 20 includes a cylinder 21 and a cover 22 that are integrally formed. The cylinder 21 is disposed around the periphery of the electrode assembly 10. The cover 22 is provided with an electrode lead-out hole 221. The cylinder 21 has an opening 211 at an end facing away from the cover 22, and the cover plate 50 covers the opening of the cylinder 21 to seal the opening of the cylinder 21.

The electrode assembly 10 is accommodated within housing 20 and includes a main body 12, a first tab 11, and a second tab 13, where the first tab 11 and the second tab 13 protrude from the main body 12. The first tab 11 is disposed at an end of the electrode assembly 10 facing the electrode terminal 30, and the second tab 13 is disposed at an end of the electrode assembly facing away from the electrode terminal 30.

The electrode terminal 30 includes a sealing plate 33 and a terminal body 34. The terminal body 34 is mounted in the electrode lead-out hole 221, and the terminal body 34 includes a concave portion 31 and a connecting portion 32 located on a side of the concave portions 31 facing the electrode assembly 10. The first through hole 323 runs through the connecting portion 32, and the first through hole 323 is configured for injecting an electrolyte into the inner space of the housing 20. The sealing plate 33 is at least partially accommodated in the concave portion 31, and the sealing plate 33 is connected to the terminal body 34 and is configured to seal the first through hole 323.

The current collecting member 40 is welded to the connecting portion 32 to form at least one first welding portion W1, and is welded to the first tab 11 to form at least one second welding portion W2, thereby electrically connecting the connecting portion 32 and the first tab 11.

It should be noted that, without conflict, the embodiments and features in the embodiments in this application may be combined with each other.

In conclusion, it should be noted that the foregoing embodiments are merely intended for describing the technical solutions of this application, but not for limiting this application. Although this application is described in detail with reference to the foregoing embodiments, a person of ordinary skills in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A battery cell, comprising:

an electrode assembly, comprising a tab;

a housing, configured to accommodate the electrode assembly; and an electrode terminal, disposed in the housing and electrically connected to the tab, the electrode terminal being provided with a first through hole, and the first through hole being configured for injecting an electrolyte into an inner space of the housing;

wherein:

the electrode assembly is a winding structure, and the electrode assembly has a second through hole at a winding center of the winding structure;

the first through hole communicates with the second through hole, so that the electrolyte injected through the first through hole is capable of flowing into the second through hole;

in an axial direction of the first through hole, a projection of the second through hole is greater than a projection of the first through hole;

the electrode terminal is electrically connected to the tab through at least one welding portion; and the at least one welding portion includes a plurality of welding portions disposed at intervals in a circumferential direction of the first through hole, or the welding portion surrounds only part of the first through hole in the circumferential direction of the first through hole.

2. The battery cell according to claim 1, wherein an angle a at which the welding portion surrounds the first through hole satisfies $180°≤α≤360°$.

3. The battery cell according to claim 1, wherein a spacing angle between two adjacent ones of the plurality of welding portions in the circumferential direction of the first through hole is less than 30°.

4. The battery cell according to claim 1, wherein each of the plurality of welding portions extends in a radial direction of the first through hole.

5. The battery cell according to claim 1, wherein a depth h of the welding portion in an axial direction of the first through hole and a minimum distance d between the welding portion and the first through hole in the radial direction of the through hole satisfy $0.1<h/d≤0.6$.

6. The battery cell according to claim 5, wherein $1.6 \text{ mm}≤d≤5.5 \text{ mm}$.

7. The battery cell according to claim 1, wherein in an axial direction of the first through hole, a projection of the first through hole at least partially overlaps with a projection of the second through hole.

8. The battery cell according to claim 1, wherein in an axial direction of the first through hole, a projection of the first through hole falls within a projection of the second through hole.

9. The battery cell according to claim 1, wherein a diameter D1 of the first through hole and a diameter D2 of the second through hole satisfy $65\%≤D1/D2≤95\%$.

10. The battery cell according to claim 1, further comprising:

a current collecting member configured to electrically connect the electrode terminal and the tab;

wherein the current collecting member comprises a third through hole, and the third through hole is at least partially disposed between the first through hole and the second through hole.

11. The battery cell according to claim 10, wherein in an axial direction of the first through hole, a projection of the third through hole is smaller than a projection of the second through hole.

12. The battery cell according to claim 10, wherein in an axial direction of the first through hole, a projection of the third through hole is greater than a projection of the first through hole.

13. The battery cell according to claim 10, wherein in an axial direction of the first through hole, a projection of the first through hole falls within a projection of the third through hole, and a projection of the third through hole falls within a projection of the second through hole.

14. The battery cell according to claim 10, wherein the first through hole, the second through hole, and the third through hole are arranged coaxially.

15. The battery cell according to claim 1, wherein the electrode terminal comprises a sealing plate and a terminal body, the terminal body is provided with the first through hole, and the sealing plate is connected to the terminal body and configured to seal the first through hole.

16. The battery cell according to claim 15, wherein:

the terminal body comprises a concave portion and a connecting portion located on a side of the concave portion facing the electrode assembly, the first through hole runs through the connecting portion, and the connecting portion is electrically connected to the first tab through at least one welding portion; and at least part of the sealing plate is accommodated in the concave portion.

17. The battery cell according to claim 1, wherein the housing comprises a cylinder and a cover connected to the cylinder, the cylinder is disposed around a periphery of the electrode assembly, the cover is provided with an electrode lead-out hole, and the electrode terminal is disposed in the electrode lead-out hole.

18. The battery cell according to claim 17, wherein:

the tab is a first tab;

the electrode assembly further comprises a second tab, the second tab is opposite in polarity to the first tab, and the second tab is electrically connected to the cover.

19. The battery cell according to claim 18, wherein the first tab is located at an end of the electrode assembly facing the electrode terminal, and the second tab is located at an end of the electrode assembly facing away from the electrode terminal.

20. The battery cell according to claim 17, wherein the cylinder has an opening at an end facing away from the cover, and the battery cell further comprises a cover plate for sealing the opening.

* * * * *